(12) United States Patent
Zhang et al.

(10) Patent No.: US 10,271,034 B2
(45) Date of Patent: Apr. 23, 2019

(54) SIMPLIFIED DEPTH CODING

(71) Applicant: QUALCOMM Incorporated, San Diego, CA (US)

(72) Inventors: Li Zhang, San Diego, CA (US); Ying Chen, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 164 days.

(21) Appl. No.: 14/196,821

(22) Filed: Mar. 4, 2014

(65) Prior Publication Data

US 2014/0253682 A1 Sep. 11, 2014

Related U.S. Application Data

(60) Provisional application No. 61/773,089, filed on Mar. 5, 2013, provisional application No. 61/805,771, filed on Mar. 27, 2013, provisional application No. 61/811,341, filed on Apr. 12, 2013.

(51) Int. Cl.
*H04N 13/00* (2018.01)
*H04N 13/161* (2018.01)
*H04N 19/597* (2014.01)
*H04N 19/70* (2014.01)
*H04N 19/593* (2014.01)
(Continued)

(52) U.S. Cl.
CPC ......... *H04N 13/161* (2018.05); *H04N 19/463* (2014.11); *H04N 19/593* (2014.11); *H04N 19/597* (2014.11); *H04N 19/70* (2014.11); *H04N 19/93* (2014.11)

(58) Field of Classification Search
CPC ............. H04N 19/597; H04N 13/0022; H04N 13/0282
USPC .......................................................... 348/43
See application file for complete search history.

(56) References Cited

U.S. PATENT DOCUMENTS

2008/0285867 A1 11/2008 Kajiwara
2009/0110073 A1 4/2009 Wu et al.
(Continued)

FOREIGN PATENT DOCUMENTS

CN 101453662 A 6/2009
CN 101465004 A 6/2009
(Continued)

OTHER PUBLICATIONS

"Model-based Intra Coding for Depth Maps in 3D Video Using a Depth Lookup Table"—Fabian Jager, Mathias Wien, Philipp Kosse, 3DTV-Conference: The True Vision—Capture, Transmission and Display of 3D Video (3DTV-CON), 2012.*
(Continued)

*Primary Examiner* — Gims S Philippe
*Assistant Examiner* — Mainul Hasan
(74) *Attorney, Agent, or Firm* — Shumaker & Sieffert, P.A.

(57) ABSTRACT

In a method of coding video data, a first depth value of a depth look up table (DLT) is determined, where the first depth value is associated with a first pixel of the video data, and a second depth value of the DLT is determined, where the second depth value is associated with a second pixel of the video data. Coding of the second depth value relative to the first depth value is performed during coding of the DLT.

14 Claims, 9 Drawing Sheets

(51) Int. Cl.
*H04N 19/463* (2014.01)
*H04N 19/93* (2014.01)

(56) References Cited

U.S. PATENT DOCUMENTS

| | | | |
|---|---|---|---|
| 2009/0161989 A1* | 6/2009 | Sim | H04N 19/597 382/285 |
| 2010/0124380 A1 | 5/2010 | Shiraishi et al. | |
| 2010/0231688 A1 | 9/2010 | Park et al. | |
| 2011/0255592 A1 | 10/2011 | Sung et al. | |
| 2013/0022111 A1* | 1/2013 | Chen | H04N 19/597 375/240.12 |
| 2014/0009574 A1 | 1/2014 | Hannuksela et al. | |
| 2015/0215600 A1* | 7/2015 | Norkin | H04N 13/398 348/43 |

FOREIGN PATENT DOCUMENTS

| | | | |
|---|---|---|---|
| EP | 2051529 A1 | 4/2009 | |
| JP | 2005079815 A | 3/2005 | |
| JP | 2008278464 A | 11/2008 | |
| JP | 2010154486 A | 7/2010 | |
| JP | 2011512067 A | 4/2011 | |
| WO | 2009092454 A1 | 7/2009 | |
| WO | WO-2012098365 A1 * | 7/2012 | G06T 9/00 |
| WO | 2013016231 A1 | 1/2013 | |

OTHER PUBLICATIONS

Jager et al., "Model-Based Intra Coding for Depth Maps in 3D Video Using a Depth Lookup Table," IEEE, 3DTV-Conference: The True Vision—Capture, Transmission and Display of 3D Video (3DTV-CON), Oct. 15-17, 2012, 4 pp.
Jager, "Simplified Depth Map Intra Coding with an Optional Depth Lookup Table," IEEE, International Conference on 3D Imaging (IC3D), Dec. 3-5, 2012, 4 pp.
Zhao et al., "CE6.h related: On signaling of DLT for depth coding," Joint Collaborative Team on 3D Video Coding Extensions of ITU-T SG 16 WP 3 and ISO/IEC JTC 1/SC 29/WG 11, Apr. 20-26, 2013, Document: JCT3V-D0182, Apr. 21, 2013, 7 pp.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "High efficiency video coding (HEVC) text specification draft 10 (For FDIS & Last Call)," 12th Meeting: Geneva, CH, Jan. 14-23, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Tech, G., et al., "3D-HEVC Test Model 2," Joint Collaborative Team on 3D Video Coding Extension Development of ITU-T SG 16 WP 3 and ISO/IEC JTC 1/SC 29/WG 11, Document: JCT3V-B1005_d0, 2nd Meeting: Shanghai, CN , Oct. 13-19, 2012, 118 pages.
Tech, "3D-HEVC Draft Text 2," Joint Collaboration Team on 3D Video Coding Extension Development of ITU-T SG 16 WP 3 and ISO/IEC JTC 1/SC 29/WG 11, Document: JCT3V-F1001-v4, 6th Meeting; Geneva, CH, Oct. 25-Nov. 1, 2013, 94 pp.
Forouzan et al., "Chapter 15—Data Compression", Online Course Material based on the Book "Foundations of Computer Science", Sep. 19, 2008, XP055138764, Kaohsiung, Taiwan, Retrieved from the Internet: URL:www.csie.kuas.edu.tw/course/CS/old/english/ch-15.ppt, 34 pp.
"Index of /course/CS/old/english", Online Course Material, National Kaohsiung University of Applied Sciences, Computer Science and Information Engineering, Sep. 8, 2014, XP055138785,Kaohsiung,Taiwan Retrieved from the Internet: URL:www.csie.kuas.edu.tw/course/CS/old/english/, 1 pp.
Jager "3D-CE6.h Results on Simplified Depth Coding with an optional Depth Lookup Table", JCT-3V Meeting; MPEG Meeting; Oct. 13-19, 2012; Shanghai; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-B0036, XP030130217, 16 pp.
Li et al., "Adaptive Pixel Encoding: An Effective Algorithm for Frame Buffer Compression", Computer and Information Technology (CIT), 2012 IEEE 12th International Conference on, IEEE, Oct. 27, 2012, pp. 5-11, XP032290324, DOI: 10.1109/CIT.2012.28, ISBN: 978-1-4673-4873-7.
Merkle "Description of Core Experiment 6 (CE6) on Depth Intra Coding", JCT-3V Meeting; MPEG Meeting; Jan. 17-23, 2013; Geneva; (The Joint Collaborative Team on 3D Video Coding Extension Development of ISO/IEC, JTC1/SC29/WG11 and ITU-T SG.16 ); URL: http://phenix.int-evry.fr/jct2/,, No. JCT3V-C1106, XP030130673, 4 pp.
Redmill "Robust and scalable video compression using matching pursuits and absolute value coding", Prroceedings 2001 International Conference on Image Processing. ICIP 2001—Thessaloniki, Greece, Oct. 7-10, 2001; Institute of Electrical and Electronics Engineers, New York, NY, vol. 2, XP010563940, ISBN: 978-0-7803-6725-8, pp. 1021-1024.
Zhang et al., "Joint multiview video plus depth coding", International Conf. on Image Processing (ICIP 2010), USA, Sep. 26-29, 2010, XP031813429, ISBN: 978-1-4244-7992-4, pp. 2865-2868.
Zhang et al., "3D-CE6.h related: An efficient coding method for DLT in 3DVC", JCT-3V Meeting; MPEG Meeting; Jan. 17-23, 2012; Geneva; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-C0142, XP030130558, 5 pp.
Zhang et al., "AHG7: An efficient coding method for DLT in 3D-HEVC", JCT-3V Meeting; Jul. 27-Aug. 2, 2013; Vienna; (The Joint Collaborative Team on 3D Video Coding Extension Development of ISO/IEC JTC1/SC29/WG11 and ITU-T SG.16); URL: http://phenix.int-evry.fr/jct2/, No. JCT3V-E0176-v3, XP030131209, 5 pp.
Zhao et al., "AHG7: On signaling of DLT for depth coding", JCT-3V Meeting; Jul. 27-Aug. 2, 2013; Vienna; (The Joint Collaborative Team on 3D Video Coding Extension Development of ISO/IEC JTC1/SC29/WG11 and ITU-T SG.16); URL: http://phenix.int-evry.fr/jct2/,,No. JCT3V-E0130, XP030131147, 8 pp.
International Search Report and Written Opinion from International Application No. PCT/US2014/020729, dated Sep. 18, 2014, 25 pp.
Response to Written Opinion dated Sep. 18, 2014, from International Application No. PCT/US2014/020729, filed on Jan. 2, 2015, 7 pp.

(56) References Cited

OTHER PUBLICATIONS

Second Written Opinion from International Application No. PCT/US2014/020729, dated May 8, 2015, 8 pp.
Response to Second Written Opinion dated May 8, 2015, from International Application No. PCT/US2014/020729, filed on Jun. 8, 2015, 7 pp.
International Preliminary Report on Patentability from International Application No. PCT/US2014/020729, dated Jul. 3, 2015, 20 pp.
Rusanovskyy et al., "Common Test Conditions of 3DV Core Experiments," 3rd Meeting, Geneva, CH, Joint Collaborative Team on 3D Video Coding Extensions of ITU-T SG 13 WP 3 and ISO/IEC JTC 1/SC 29/WG11, Jan. 17-23, 2013, Document: JCT3V-C1100, Jan. 22, 2013, 5 pp.
Sze et al., "Modifications to Slice Header termination for low delay encoding," Joint Collaborative Team on Video Coding (JCT-VC), of ITU-T SG16 WP3 and ISO/IEC JTC1/SC29/WG11, 6th Meeting: Torino, IT, Jul. 14-22, 2011, Document: JCTVC-F131, WG11 No. m20548, 5 pp.
Tech et al., "3D-HEVC Test Model 3," JCT-3V Meeting; MPEG Meeting; Jan. 17-23, 2013; Geneva, CH (The Joint Collaborative Team on 3D Video Coding Extension Development of ISO/IEC JTC1/SC29/WG11 and ITU-T SG.16); URL: http://phenix.int-evry.fr/jct2/, No. JCT3V-C1005-d0,Mar. 15, 2013, 52 pp. XP030130664.
Bross, et al., "High Efficiency Video Coding (HEVC) text specification draft 10 (for FDIS & Consent)," Jan. 14-23, 2013; (Joint Collaborative Team on Video Coding of ISO/IEC JTC1/SC29/WG11 and ITU-T SG.16), No. JCTVC-L1003_v14; Jan. 31, 2013; 334 pp.
Jager F: "3D-CE6.h: Simplified Depth Coding with an optional Depth Lookup Table," 2. JCT-3V Meeting; 102. MPEG Meeting; Oct. 13-19, 2012; Shanghai, CN {The Joint Collaborative Team on 3D Video Coding Extension Development of ISO/IEC JTC1/SC29/WG11); URL: http://phenix.int-evry.fr/jct2/,No. JCT3V-B0036, Oct. 16, 2012 {Oct. 16, 2012), 16 pp. XP030130217.
Rusanovskyy D., et al., "Common Test Conditions of 3DV Core Experiments," Joint Collaborative Team on 3D Video Coding Extensions of ITU-T SG 13 WP 3 and ISO/IEC JTC 1/SC 29/WG11, Jan. 17-23, 2013, Document: JCT3V-C1100, Jan. 22, 2013, 5 pp.
Merkle P: "Description of Core Experiment 6 (CE6) on Depth Intra Coding", 3. JCT-3V Meeting; 103. MPEG Meeting; Jan. 1, 2013-Jan. 23, 2013; Geneva; (The Joint Collaborative Team on 3D Video Coding Extension Development of ISO/IEC, JTC1/SC29/WG11 and ITU-T SG.16); URL: http://phenix.int-evry.fr/jct2/,, No. JCT3V-C1106, Jan. 23, 2013 (Jan. 23, 2013), XP030130673.
Zhao X., et al., "CE6.h related: On signaling of DLT for depth coding," Document: JCT3V-D0182, Joint Collaborative Team on 3D Video Coding Extensions of ITU-T SG 16 WP 3 and ISO/IEC JTC 1/SC 29/WG 11, 4th Meeting: Incheon, KR Apr. 20-26, 2013, 7 pages.

\* cited by examiner

US 10,271,034 B2

SIMPLIFIED DEPTH CODING

This application claims the benefit of U.S. Provisional Patent Application No. 61/773,089, filed Mar. 5, 2013, U.S. Provisional Application No. 61/805,771, filed Mar. 27, 2013, and U.S. Provisional Patent Application No. 61/811,341, filed Apr. 12, 2013, the entire contents of each of which are incorporated by reference herein.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards presently under development. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a picture or a portion of a picture) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the spatial domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

Techniques of this disclosure include techniques associated with signaling and prediction of depth lookup tables (DLTs). For example, in some instances of three-dimensional (3D) video coding, a depth map may be used to represent depth values associated with pixels of a picture. The depth values may be organized in a DLT, with each depth value of the DLT having an associated index value. According to aspects of this disclosure, one or more values of a DLT may be coded relative to one or more other depth values of the DLT, thereby achieving a bit savings relative to coding the actual depth values. Additionally or alternatively, according to aspects of this disclosure, inter-view DLT prediction may be performed to reduce redundancy of depth values appearing in DLTs of more than one view.

In one example, this disclosure describes a method of coding video data, the method comprising determining a first depth value of a depth look up table (DLT), wherein the first depth value is associated with a first pixel of the video data, determining a second depth value of the DLT, wherein the second depth value is associated with a second pixel of the video data, and coding the DLT including coding the second depth value relative to the first depth value.

In another example, this disclosure describes an apparatus for coding video data that includes a memory storing video data, and one or more processors configured to determine a first depth value of a depth look up table (DLT), wherein the first depth value is associated with a first pixel of the video data, determine a second depth value of the DLT, wherein the second depth value is associated with a second pixel of the video data, and code the DLT including coding the second depth value relative to the first depth value.

In another example, this disclosure describes an apparatus for coding video data that includes means for determining a first depth value of a depth look up table (DLT), wherein the first depth value is associated with a first pixel of the video data, means for determining a second depth value of the DLT, wherein the second depth value is associated with a second pixel of the video data, and means for coding the DLT including coding the second depth value relative to the first depth value.

In another example, this disclosure describes a non-transitory computer-readable storage medium having instructions stored thereon that, when executed, cause one or more processors to determine a first depth value of a depth look up table (DLT), wherein the first depth value is associated with a first pixel of the video data, determine a second depth value of the DLT, wherein the second depth value is associated with a second pixel of the video data, and code the DLT including coding the second depth value relative to the first depth value.

The details of one or more examples of the disclosure are set forth in the accompanying drawings and the description below. Other features, objects, and advantages will be apparent from the description, drawings, and claims.

DETAILED DESCRIPTION

Figure 1:
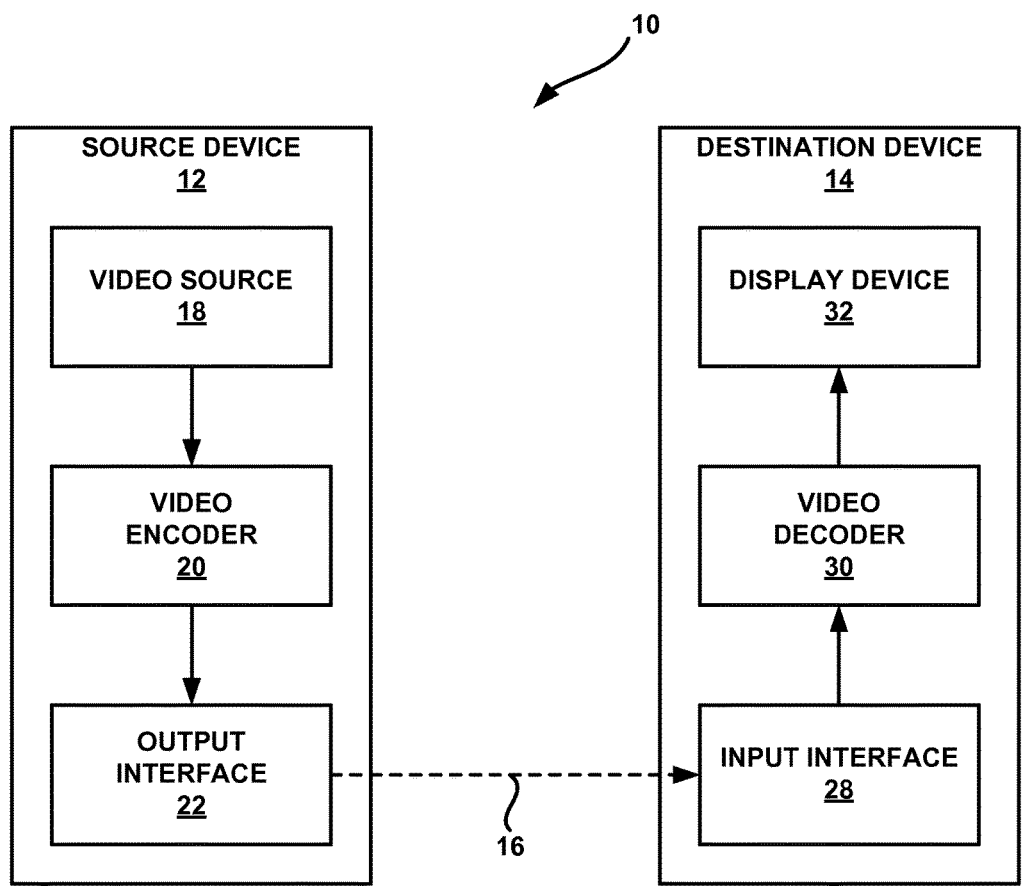
FIG. 1 is a block diagram illustrating an example video encoding and decoding system that may utilize the techniques of this disclosure for depth coding.

In general, the techniques of this disclosure are related to three-dimensional (3D) video coding. That is, video data coded using these techniques may be rendered and displayed to produce a three-dimensional effect. For example, two images of different views (that is, corresponding to two camera perspectives having slightly different horizontal positions) may be displayed substantially simultaneously such that one image is seen by a viewer's left eye, and the other image is seen by the viewer's right eye.

The 3D effect may be achieved using, for example, stereoscopic displays or autostereoscopic displays. Stereoscopic displays may be used in conjunction with eyewear that filters the two images accordingly. For example, passive glasses may filter the images using polarized lenses or different colored lenses to ensure that the proper eye views the proper image. Active glasses, as another example, may rapidly shutter alternate lenses in coordination with the stereoscopic display, which may alternate between displaying the left eye image and the right eye image. Autostereoscopic displays display the two images in such a way that no glasses are needed. For example, autostereoscopic displays may include mirrors or prisms that are configured to cause each image to be projected into a viewer's appropriate eyes.

The techniques of this disclosure relate to coding 3D video data by coding texture data and depth data. In general, the term "texture" is used to describe luminance (that is, brightness or "luma") values of an image and chrominance (that is, color or "chroma") values of the image. In some examples, a texture image may include one set of luminance data and two sets of chrominance data for blue hues (Cb) and red hues (Cr). In certain chroma formats, such as 4:2:2 or 4:2:0, the chroma data is downsampled relative to the luma data. That is, the spatial resolution of chrominance pixels may be lower than the spatial resolution of corresponding luminance pixels, e.g., one-half or one-quarter of the luminance resolution.

Depth data generally describes depth values for corresponding texture data. For example, a depth image may include a set of depth pixels that each describes depth for corresponding texture data. The depth data may be used to determine horizontal disparity for the corresponding texture data. Thus, a device that receives the texture and depth data may display a first texture image for one view (e.g., a left eye view) and use the depth data to modify the first texture image to generate a second texture image for the other view (e.g., a right eye view) by offsetting pixel values of the first image by the horizontal disparity values determined based on the depth values. In general, horizontal disparity (or simply "disparity") describes the horizontal spatial offset of a pixel in a first view to a corresponding pixel in the right view, where the two pixels correspond to the same portion of the same object as represented in the two views.

In still other examples, depth data may be defined for pixels in a z-dimension perpendicular to the image plane, such that a depth associated with a given pixel is defined relative to a zero disparity plane defined for the image. Such depth may be used to create horizontal disparity for displaying the pixel, such that the pixel is displayed differently for the left and right eyes, depending on the z-dimension depth value of the pixel relative to the zero disparity plane.

The zero disparity plane may change for different portions of a video sequence, and the amount of depth relative to the zero-disparity plane may also change. Pixels located on the zero disparity plane may be defined similarly for the left and right eyes. Pixels located in front of the zero disparity plane may be displayed in different locations for the left and right eye (e.g., with horizontal disparity) so as to create a perception that the pixel appears to come out of the image in the z-direction perpendicular to the image plane. Pixels located behind the zero disparity plane may be displayed with a slight blur, to slight perception of depth, or may be displayed in different locations for the left and right eye (e.g., with horizontal disparity that is opposite that of pixels located in front of the zero disparity plane). Many other techniques may also be used to convey or define depth data for an image.

Two-dimensional video data is generally coded as a sequence of discrete pictures, each of which corresponds to a particular temporal instance. That is, each picture has an associated playback time relative to playback times of other images in the sequence. These pictures may be considered texture pictures or texture images. In depth-based 3D video coding, each texture picture in a sequence may also correspond to a depth map. That is, a depth map corresponding to a texture picture describes depth data for the corresponding texture picture. Multiview video data may include data for various different views, where each view may include a respective sequence of texture pictures and corresponding depth pictures.

As noted above, images may correspond to a particular temporal instance. Video data may be represented using a sequence of access units, where each access unit includes all data corresponding to a particular temporal instance. Thus, for example, for multiview video data plus depth, texture images from each view for a common temporal instance, plus the depth maps for each of the texture images, may all be included within a particular access unit. An access unit may include data for a texture component, corresponding to a texture image, and a depth component, corresponding to a depth map.

In this manner, 3D video data may be represented using a multiview video plus depth format, in which captured or generated views (texture) are associated with corresponding depth maps. Moreover, in 3D video coding, textures and depth maps may be coded and multiplexed into a 3D video bitstream. Depth maps may be coded as grayscale images, where "luma" samples (that is, pixels) of the depth maps represent depth values. Conventional intra- and inter-coding methods can be applied for depth map coding.

Depth maps commonly include sharp edges and constant areas, and edges in depth maps typically present strong correlations with corresponding texture data. Due to the different statistics and correlations between texture and corresponding depth, different coding schemes have been and continue to be designed for depth maps based on a 2D video codec.

Some coding schemes that are particular to depth map coding, as discussed in greater detail below, relate to partitioning blocks of a depth map into various prediction regions. For example, blocks of a depth map may be partitioned using Wedgelet patterns or Contour patterns, as described in greater detail below. In general, Wedgelet patterns are defined by an arbitrary line drawn through a block of depth map data, while in Contour partitioning, a depth block may be partitioned into two irregularly-shaped regions.

Techniques of this disclosure generally relate to coding depth information, and may be applicable in conjunction with the High Efficiency Video Coding (HEVC) standard. For example, the Joint Video Team (JVT) recently developed a base version (2D) of HEVC that provides higher efficiency than previously developed video coding standards. A Joint Collaboration Team on 3D Video Coding (JCT-3V) is currently conducting study of two three-dimensional video (3DV) solutions as extensions to HEVC. One example includes a multi-view extension of HEVC that is referred to as MV-HEVC. Another example includes a depth enhanced 3D video extension (3D-HEVC). An example of reference software 3D-HTM version 5.1 for 3D-HEVC is available publically at https://hevc.hhi.fraunhofer.de/svn/svn_3DVCSoftware/tags/HTM-5.1/. A software description is available from http://phenix.it-sudparis.eu/jct2/doc_end_user/documents/2_Shanghai/wg11/JCT3V-B1005-v1.zip (document number B1005).

In 3D-HEVC, each access unit contains multiple view components, each contains a unique view id, or view order index, or layer id. A view component contains a texture view component as well as a depth view component. A texture view component may be coded as one or more texture slices, while a depth view component may be coded as one or more depth slices.

In some instances, depth information may be intra-coded, which relies on spatial prediction to reduce or remove spatial redundancy within a given picture. For example, in 3D-HEVC, a video coder (e.g., a video encoder or video decoder) may use intra-prediction modes from the base (2D) HEVC standard to code an intra-prediction unit of a depth slice. Intra-modes of the HEVC standard are described in greater detail below with respect to FIG. 4. In another example, the video coder may use depth modeling modes (DMMs) to code an intra-prediction unit of a depth slice. DMMs of 3D-HEVC are described in greater detail below with respect to FIGS. 5A and 5B. In another example, the video coder may use region boundary chain coding to code an intra-prediction unit of a depth slice. Region boundary chain coding is described in greater detail below with respect to FIG. 6. The video coder may use the intra-modes above (e.g., HEVC intra-modes, DMMs, and/or region boundary chain coding) to generate residual depth values. The video coder may then transform and quantize the residual depth values, as described in greater detail below.

In some instances, the video coder may use a simplified depth coding (SDC) mode to code an intra-prediction unit of a depth slice. In contrast to the intra-mode coding schemes described above, when using an SDC mode, the video coder does not transform or quantize the residual depth values. Rather, in some examples, the video coder may directly code a residual depth value of each partition. In such examples, the video coder may calculate the residual depth value by subtracting a predictor (e.g., generated based on neighboring samples) from an average value of the current partition.

In other examples, instead of coding the residual value, the video coder may code an index difference mapped from a Depth Lookup Table (DLT). For example, a video encoder may calculate the index difference by subtracting the index of the predictor from the index of the average value of the current partition. A video decoder may calculate the sum of a decoded index difference and an index of a predictor, and may map the sum back to a depth value based on the DLT.

In this way, a DLT may map depth values of an original depth map. The DLT may be constructed by analyzing frames of a first intra-period before encoding a full sequence of pictures. In some instances, a video coder may sort all valid depth values in ascending order before inserting the values into a DLT with increasing indexes. In some instances, when the value of a predictor or average value is not included in a DLT, the value may be mapped to an index i, where the absolute value of a predictor value divided by an average value minus the value of the i-th entry in DLT is a minimum value.

A video coder may use a DLT as an optional coding tool. For example, a video encoder may not use a DLT if more than half of the values from 0 to a maximum depth value (e.g., MAX_DEPTH_VALUE; 255 for 8-bit depth samples) appear in an original depth map at an analysis stage. Otherwise, the video encoder may code a DLT in a parameter set, such as a sequence or video parameter set. In some instances, the number of valid depth values may be coded first using an exponential-Golomb (Exp-Golomb) code. Each valid depth value may then be coded with an Exp-Golomb code.

According to one example 3D-HEVC design, such as version 5.1 noted above, when deriving predicted DC values, a video coder (e.g., video encoder or video decoder) may directly code depth values without considering the ascending characteristics of depth values, which may not be efficient. In addition, the relationship between depth values of different views is not utilized in version 5.1. Accordingly, many bits may be wasted on signaling redundant depth values. Moreover, signaling a DLT in either a sequence parameter set (SPS) or video parameter set (VPS) may not be efficient when there are scene changes within one sequence/view. In addition, exp-Golomb codes may be inefficient when coding depth values, because there is no assumption that the depth values with shorter codes have a higher probability of occurrence.

Aspects of this disclosure generally relate to DLT signaling, and while not limited to any particular coding standard, may be implemented to address one or more of the issues described with respect to 3D-HEVC above. For example, according to some aspects of this disclosure, a depth value of a DLT may be predicted and coded relative to another depth value of the DLT. In an example for purposes of illustration, assume that a depth value that is the j-th entry in a DLT for depth view components with a layer_id equal to i is denoted by dlt_D[i][j]. In this example, a first valid depth value (e.g., dlt_D[i][0]) may be directly signaled in a bitstream. The remaining depth values of the DLT may be differentially coded based on the previous depth value in the DLT (e.g., dlt_D[i][j]−dlt_D[i][j−1]). In this way, the second depth value of the DLT (dlt_D[i][j−1]) can be coded relative to the first value of the DLT (dlt_D[i][j]).

In another example, according to aspects of this disclosure, depth values of a DLT may be predicted between views, i.e., inter-view DLT prediction. In this example, a video coder may code a DLT value of one view relative to a DLT value in a second, different view. For example, a base view may include an associated DLT having a set of depth values. A second, non-base view may include its own associated DLT having a set of depth values, referred to in this example as a second DLT. According to aspects of this disclosure, values of the second DLT may be coded relative to the DLT for the base view. For example, one or more syntax elements may indicate that values of the second DLT appear in the base view DLT, such that the actual values of the second DLT do not need to be signaled.

In this way, the techniques may reduce the amount of data included in a bitstream for depth coding. For example, the techniques of this disclosure may reduce redundancy associated with DLTs, thereby reducing the number of bits required for signaling depth values in an encoded bitstream.

FIG. 1 is a block diagram illustrating an example video encoding and decoding system 10 that may utilize the techniques of this disclosure for depth coding. As shown in FIG. 1, system 10 includes a source device 12 that generates encoded video data to be decoded at a later time by a destination device 14. In particular, source device 12 may store the encoded video data to computer-readable medium 16 such that the encoded video may be accessed by the destination device 14. Source device 12 and destination device 14 may include any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

As noted above, destination device 14 may access encoded video data to be decoded that has been stored to computer-readable medium 16. Computer-readable medium 16 may include any type of non-transitory medium or device capable of moving the encoded video data from source device 12 to destination device 14. In one example, computer-readable medium 16 may comprise a communication medium to enable source device 12 to transmit encoded video data directly to destination device 14 in real-time.

The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device, such that computer-readable medium 16 includes the storage device. Similarly, encoded data may be accessed from the storage device by input interface 28. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12.

Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for motion vector prediction in multi-view coding. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for depth coding may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored (e.g., stored to computer-readable medium 16) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CO-DEC). A device including video encoder 20 and/or video decoder 30 may comprise an integrated circuit, a microprocessor, and/or a wireless communication device, such as a cellular telephone.

Video encoder 20 and video decoder 30 may operate according to a video coding standard, such as the ITU-T H.264/MPEG-4 (AVC) standard, which was formulated by the ITU-T Video Coding Experts Group (VCEG) together with the ISO/IEC Moving Picture Experts Group (MPEG) as the product of a collective partnership known as the Joint Video Team (JVT). Another video coding standard includes the H.264 standard, including its Scalable Video Coding (SVC) and Multiview Video Coding (MVC) extensions. The H.264 standard is described in ITU-T Recommendation H.264, Advanced Video Coding for generic audiovisual services, by the ITU-T Study Group. The Joint Video Team (JVT) continues to work on extensions to H.264/MPEG-4 AVC. The latest joint draft of MVC is described in "Advanced video coding for generic audiovisual services," ITU-T Recommendation H.264, March 2010.

Alternatively, video encoder 20 and video decoder 30 may operate according to a High Efficiency Video Coding (HEVC) standard, and may conform to the HEVC Test Model (HM). HEVC was developed by JCT-VC of ITU-T VCEG and ISO/IEC MPEG. A recent draft of HEVC is available from http://phenix.int-evry.fr/jct/doc_end_user/documents/12_Geneva/wg11/JCTVC-L1003-v14.zip. The HEVC standardization efforts were based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-five intra-prediction encoding modes.

In general, the working model of the HM describes that a video picture (or "frame") may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder 20 may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of pictures. As described herein, "picture" and "frame" may be used interchangeably. That is, picture containing video data may be referred to as video frame, or simply "frame." A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, video encoder 20 may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

Video encoder 20 may further send syntax data, such as block-based syntax data, picture-based syntax data, and GOP-based syntax data, to video decoder 30, e.g., in a picture header, a block header, a slice header, or a GOP header. The GOP syntax data may describe a number of pictures in the respective GOP, and the picture syntax data may indicate an encoding/prediction mode used to encode the corresponding picture.

In some instances, video encoder 20 and/or video decoder 30 may intra-code depth information. For example, in 3D-HEVC, video encoder 20 and/or video decoder 30 may use intra-prediction modes from the base (2D) HEVC standard to code an intra-prediction unit of a depth slice. In another example, video encoder 20 and/or video decoder 30 may use depth modeling modes (DMMs) to code an intra-prediction unit of a depth slice. In another example, video encoder 20 and/or video decoder 30 may use region boundary chain coding to code an intra-prediction unit of a depth slice. In still another example, video encoder 20 and/or video decoder 30 may use a simplified depth coding (SDC) mode to code an intra-prediction unit of a depth slice.

With respect to SDC coding modes, instead of coding residual depth values, video encoder 20 and/or video decoder 30 may code an index difference mapped from a DLT. For example, video encoder 20 may calculate an index difference by subtracting an index of a predictor from an index of the average value of the current partition. Video decoder 30 may calculate the sum of a decoded index difference and an index of a predictor, and may map the sum back to a depth value based on the DLT. In this way, a DLT may map depth values of an original depth map.

Aspects of this disclosure relate to DLTs. For example, according to aspects of this disclosure, video encoder 20 and/or video decoder 30 may determine a first depth value of a DLT, wherein the first depth value is associated with a first pixel of the video data, determine a second depth value of the DLT, wherein the second depth value is associated with a second pixel of the video data, and code the DLT including coding the second depth value relative to the first depth value.

In an example for purposes of illustration, assume a depth value with the j-th entry in a DLT for depth view components with layer_id equal to i is denoted by dlt_D[i][j]. According to aspects of this disclosure, as described in greater detail below, video encoder 20 and/or video decoder 30 may predict a depth value within the DLT using one or more other depth values of the DLT. For example, video encoder 20 may signal a first valid depth value (e.g., dlt_D[i][0]) in an encoded bitstream. Video encoder 20 may then differentially encode remaining consecutive depth values of the DLT based on the previous depth value in the DLT (e.g., dlt_D[i][j]−dlt_D[i][j−1]). That is, video encoder 20 may encode an indication of the difference between one depth value and the next consecutive depth value in the bitstream.

In the example above, video decoder 30 may parse and decode the initial depth value for the DLT. Video decoder 30 may then reconstruct the remainder of the DLT by applying reciprocal process applied at video encoder 20. That is, video decoder 30 may add the received and decoded difference value to the previous consecutive depth value in the DLT. Other examples are also possible, as described in greater detail with respect to FIG. 7 below.

Additionally or alternatively, according to aspects of this disclosure, video encoder 20 and/or video decoder 30 may predict values of a DLT between views, i.e., inter-view predict DLTs. In this example, video encoder 20 and/or video decoder 30 may use a DLT associated with one view to predict and code at least a portion of a DLT associated with a second, different view.

In an example for purposes of illustration, assume a first DLT includes a first set of depth values. In addition, a second DLT includes a second set of depth values. The number of depth values in the first set is equal to the number of depth values in the second set. In this example, video encoder and/or video decoder 30 may be configured to code, for the second DLT, an indication of a location of depth values in the first DLT that are the same as those in the second DLT. In some examples, the indication may be a starting location and/or ending location in the first DLT. Upon receiving the indication of the location of the overlapping depth values between the first DLT and the second DLT, video decoder 30 may reconstruct the second DLT using the first DLT.

In some examples, the number of depth values in the second set associated with the second DLT may be larger than the number of depth values in the first set associated with the first DLT. In this example, video encoder 20 may signal that the second DLT includes all of the depth values of the first DLT. In addition, video encoder 20 may signal any depth values for the second DLT that are not included in the first DLT. Accordingly, upon receiving the information above, video decoder 30 may reconstruct the second DLT by copying the first DLT and adding the additional signaled depth values to the second DLT. Other examples are also possible, as described with respect to FIG. 7 below.

Figure 2:
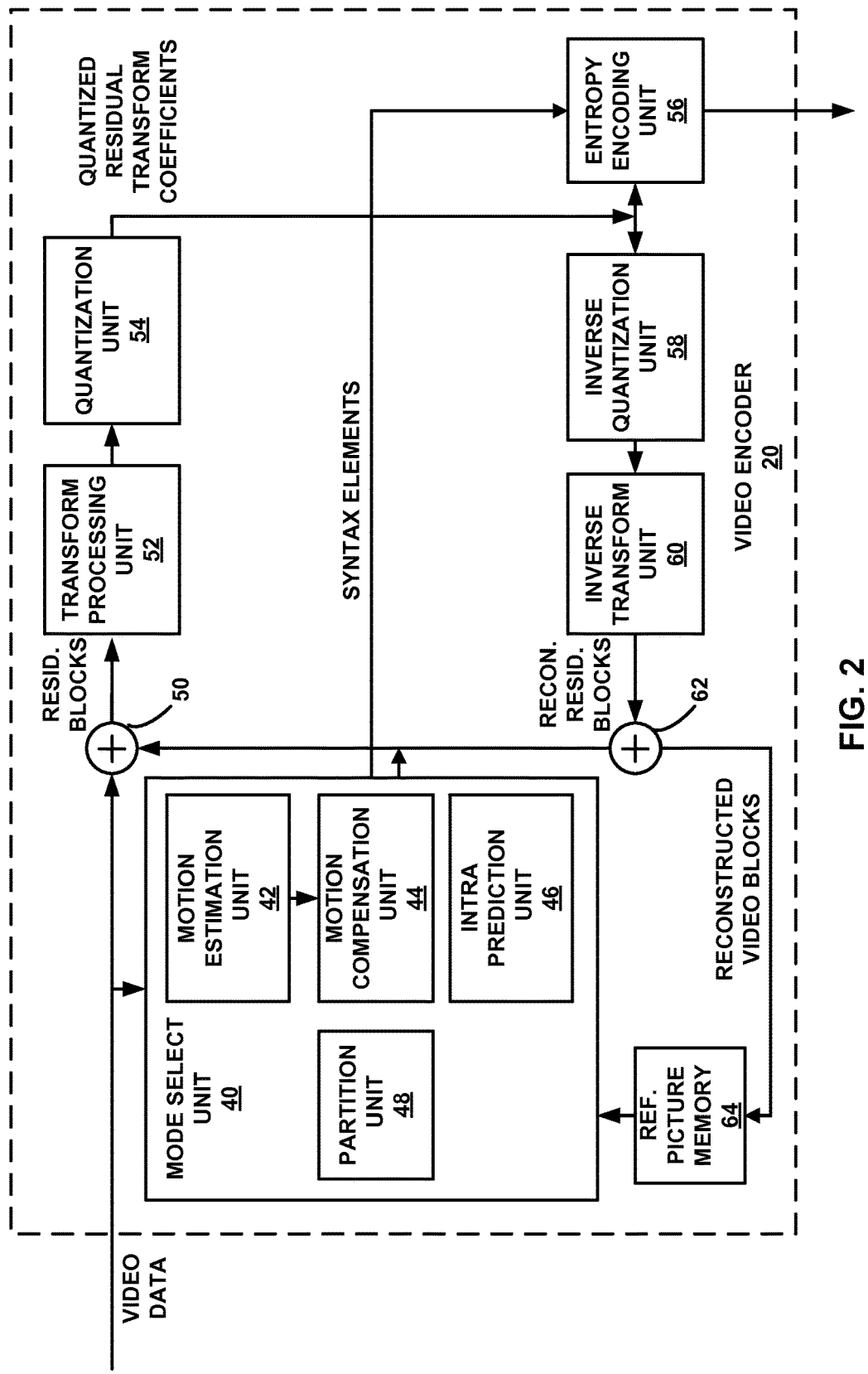
FIG. 2 is a block diagram illustrating an example of video encoder that may implement techniques for depth coding consistent with this disclosure.

FIG. 2 is a block diagram illustrating an example of video encoder 20 that may implement techniques for depth coding. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As noted above, video encoder 20 may be adapted to perform mutliview video coding. In some instances, video encoder 20 may be configured to code multi-view HEVC, such that each view in a time instance may be processed by a decoder, such as video decoder 30. For HEVC-3D, in addition to encoding texture maps (i.e., luma and chroma values) for each view, video encoder 20 may further encode a depth map for each view.

In any case, as shown in FIG. 2, video encoder 20 receives a current video block within a video frame to be encoded. In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics.

In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists.

Summer 50 forms a residual video block by subtracting pixel values of the predictive block from the pixel values of the current video block being coded, thereby forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

In addition, intra-prediction unit 46 may be configured to code depth information, e.g., depth blocks of a depth map. For example, intra-prediction unit 46 may intra-predict depth information and determine residual values. Intra-prediction unit 46 may directly code the residual value of each partition, or, instead of coding the residual value, may code depth values based on an index to a DLT. For example, a DLT may include a set of depth values with each depth value having a corresponding index. Intra-prediction unit 46 may predict an index for a current block (e.g., partition) using an index for one or more other blocks. For example, intra-prediction unit 46 may calculate an index difference by subtracting the index of an index predictor from the index associated with an average depth value of the current block (e.g., partition).

According to aspects of this disclosure, a unit of video encoder 20 responsible for coding DLTs, e.g., such as entropy encoding unit 56, may predict values of a DLT relative to one or more other values of the DLT. For example, rather than encoding the actual depth values in a DLT, entropy encoding unit 56 may determine a difference between one or more consecutive depth values of a DLT and may encode the difference values, as described in greater detail with respect to FIG. 7. Doing so may reduce the number of bits associated with signaling the DLT in a bitstream. In some examples, entropy encoding unit 56 may generate one or more syntax elements indicating that difference values between consecutive entries are the same. In an example for purposes of illustration, if all depth values differences are two (e.g., with depth values in a DLT of 0, 2, 4, 6, and so on) entropy encoding unit 56 may signal a flag indicating the similarity of difference values as well as the difference value.

Additionally or alternatively, according to aspects of this disclosure, entropy encoding unit 56 may signal depth values associated with a DLT of one view relative to depth values associated with a DLT of a second, different view, i.e., inter-view DLT prediction. For example, entropy encoding unit 56 may include one or more syntax elements in a bitstream indicating that one or more depth values of a DLT of a first view are equal to one or more depth values of a DLT of a second, different view. Entropy encoding unit 56 may also generate one more syntax elements indicating that inter-view DLT prediction is enabled.

Entropy encoding unit 56 may encode data representing one or more DLTs (including the difference values described above) in a parameter set. For example, entropy encoding unit 56 may include the one or more DLTs in a picture parameter set (PPS). In some examples, the DLTs may be only present in PPSs that are referred by slices in view components of a base view.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

It should be understood that units of video encoder 20 are provided for purposes of illustration, and that techniques ascribed to a particular unit (such as entropy encoding unit 56) may be carried out by one or more other or additional units of video encoder 20.

Figure 3:
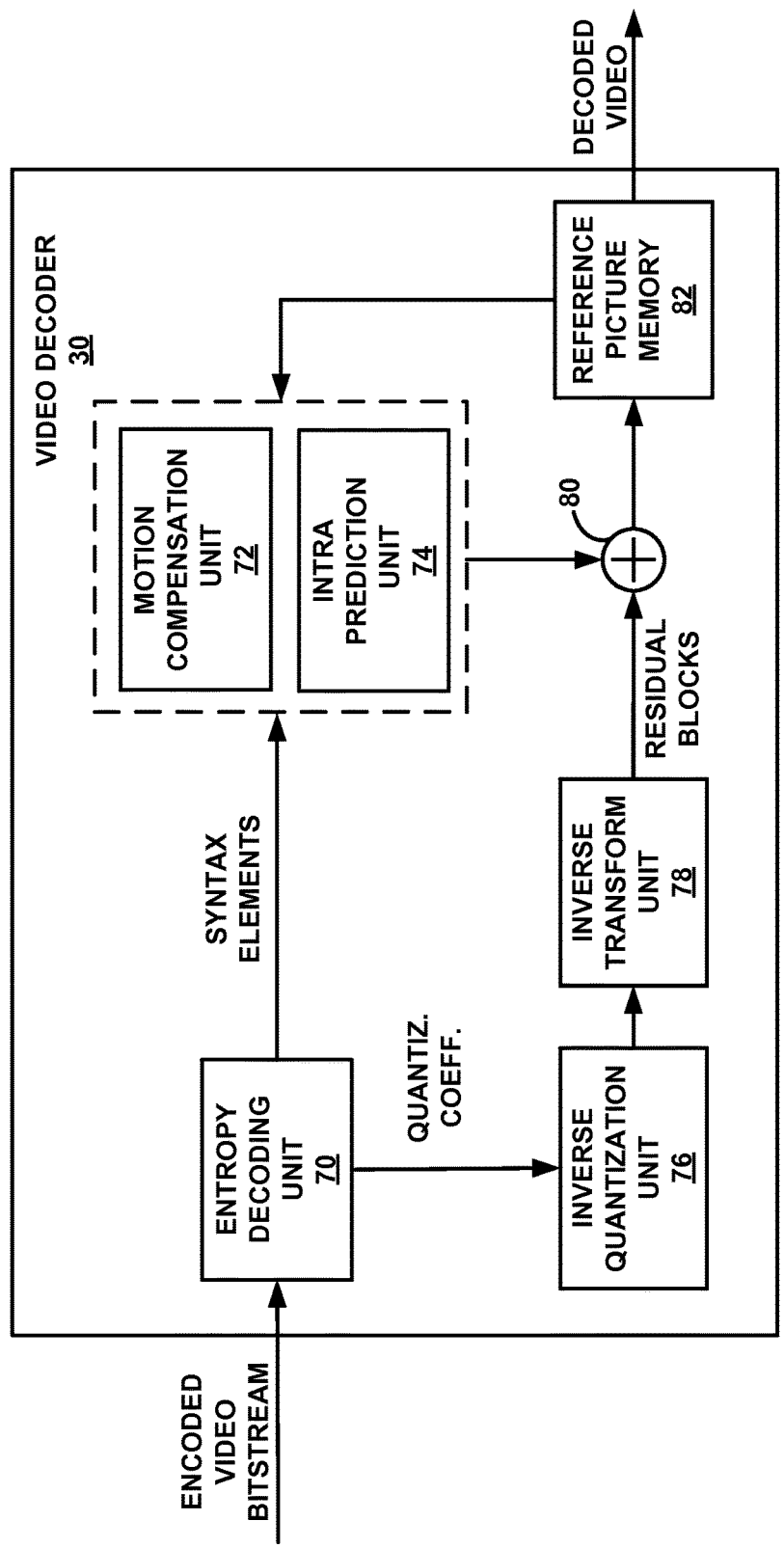
FIG. 3 is a block diagram illustrating an example of video decoder that may implement techniques for depth coding consistent with this disclosure.

FIG. 3 is a block diagram illustrating an example of video decoder 30 that may implement techniques for depth coding. In the example of FIG. 3, video decoder 30 includes an entropy decoding unit 70, motion compensation unit 72, intra-prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

By way of background, video decoder 30 may receive compressed video data that has been compressed for transmission via a network into so-called "network abstraction layer units" or NAL units. Each NAL unit may include a header that identifies a type of data stored to the NAL unit. There are two types of data that are commonly stored to NAL units. The first type of data stored to a NAL unit is video coding layer (VCL) data, which includes the compressed video data. The second type of data stored to a NAL unit is referred to as non-VCL data, which includes additional information such as parameter sets that define header data common to a large number of NAL units and supplemental enhancement information (SEI).

For example, parameter sets may contain the sequence-level header information (e.g., in an SPS or a VPS) and the infrequently changing picture-level header information (e.g., in PPSs). The infrequently changing information contained in the parameter sets does not need to be repeated for each sequence or picture, thereby improving coding efficiency. In addition, the use of parameter sets enables out-of-band transmission of header information, thereby avoiding the need of redundant transmissions for error resilience.

As noted above, video decoder 30 may be adapted to perform mutliview video coding. In some instances, video decoder 30 may be configured to decode multi-view HEVC. For HEVC-3D, in addition to decoding texture maps (i.e., luma and chroma values) for each view, video decoder 30 may further decode a depth map for each view.

In any case, when the video slice is coded as an intra-coded (I) slice, intra-prediction unit 74 may generate prediction data for a video block of the current video slice based on a signaled intra prediction mode and data from previously decoded blocks of the current frame or picture. In addition, intra-prediction unit 74 may be configured to code depth information, e.g., depth blocks of a depth map. For example, intra-prediction unit 74 may intra-predict depth information and receive residual values.

Intra-prediction unit 74 may directly receive and decode the residual value of each partition, or may decode depth values based on indexes to a DLT. For example, as noted above, a DLT may include a set of depth values with each depth value having a corresponding index. Intra-prediction unit 74 may receive an index difference that is based on the difference between the index of an index predictor and an index associated with an average depth value of the current block. Intra-prediction unit 74 may determine the depth value for the current block based on the index determined by the sum of the decoded index difference and the index of the index predictor.

According to aspects of this disclosure, video decoder 30 (e.g., entropy decoding unit 70 of video decoder 30) may predict values of a DLT relative to one or more other values of the DLT. For example, rather than decoding the actual depth values in a DLT, entropy decoding unit 70 may parse and decode a difference between one or more consecutive depth values of a DLT, as described in greater detail with respect to FIG. 7. Entropy decoding unit 70 may reconstruct an actual depth value by adding received difference value to the previous depth value in the DLT.

In some examples, entropy decoding unit 70 may receive one or more syntax elements indicating that difference values between consecutive entries are the same. In an example for purposes of illustration, if all depth values differences are two (e.g., with depth values in a DLT of 0, 2, 4, 6, and so on) video decoder 30 may receive a flag indicating the similarity of difference values as well as the difference value.

Additionally or alternatively, according to aspects of this disclosure, entropy decoding unit 70 may determine depth values associated with a DLT of one view relative to depth values associated with a DLT of a second, different view, i.e., inter-view DLT prediction. For example, entropy decoding unit 70 may parse and decode one or more syntax elements in a bitstream indicating that one or more depth values of a DLT of a first view are equal to one or more depth values of a DLT of a second, different view. Entropy decoding unit 70 may then generate the DLT for one view by copying DLT values from the other view. Entropy decoding unit 70 may also receive one more syntax elements indicating that intra-view DLT prediction is enabled.

Entropy decoding unit 70 may decode data representing one or more DLTs (including the difference values described above) in a parameter set. For example, entropy decoding unit 70 may receive the one or more DLTs in a PPS. In some examples, the DLTs may be only present in PPSs that are referred by slices in view components of a base view.

When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 or intra-prediction unit 74 generates the predictive block for the current video block (e.g., a texture block or a depth block) based on motion vectors or other syntax elements, video decoder 30 forms a decoded video block by summing the residual blocks from inverse transform unit 78 with the corresponding predictive blocks generated by motion compensation unit 72 or intra-prediction unit 74. Summer 80 represents the component or components that perform this summation operation.

If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

It should be understood that units of video decoder 30 are provided for purposes of illustration, and that techniques ascribed to a particular unit (such as entropy decoding unit 70) may be carried out by one or more other or additional units of video decoder 30.

Figure 4:
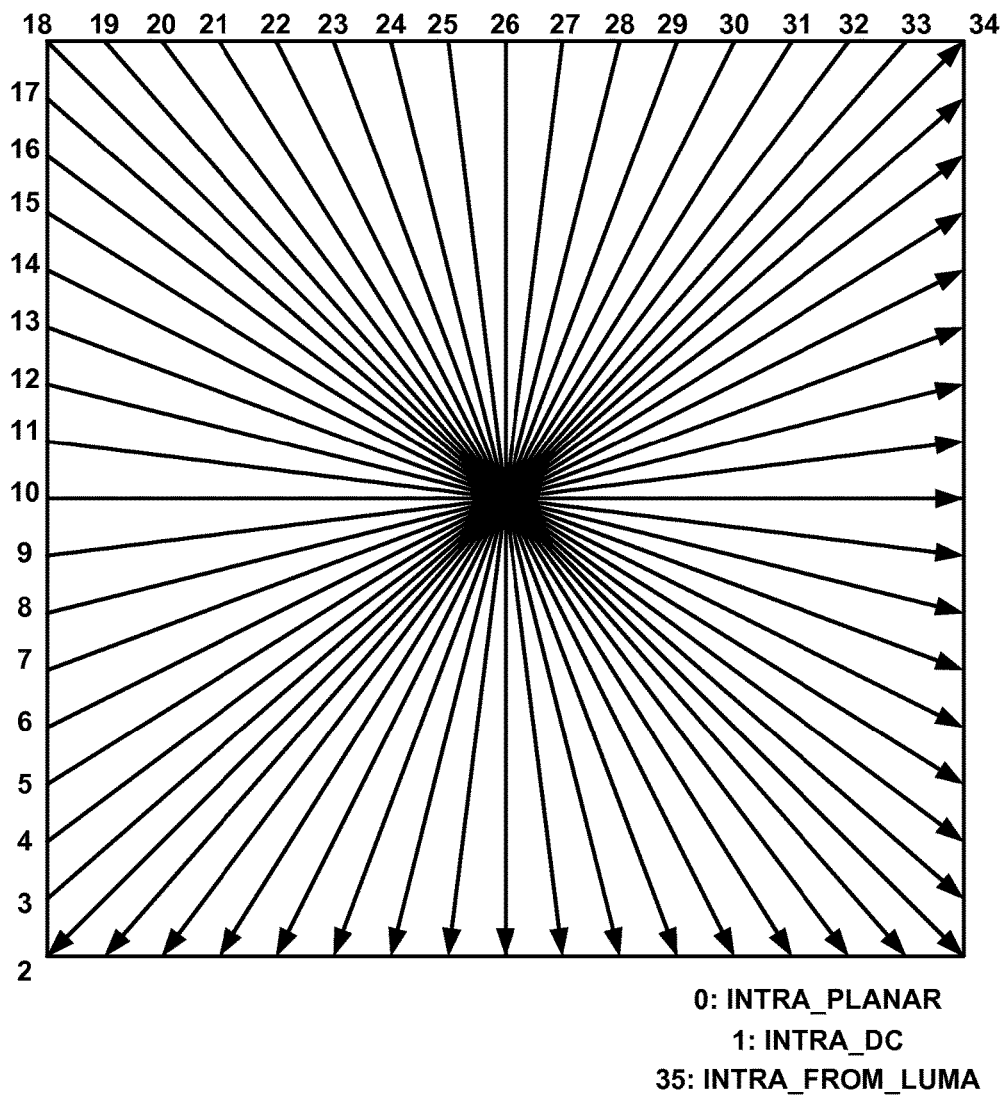
FIG. 4 generally illustrates the prediction directions associated with directional intra-prediction modes.

FIG. 4 generally illustrates the prediction directions associated with directional intra-prediction modes. For example, as noted above, the HEVC standard may include thirty five intra-prediction modes, including a planar mode (mode 0), a DC mode (mode 1) and 33 directional prediction modes (modes 2-34). With planar mode, prediction is performed using a so-called "plane" function. With DC mode, prediction is performed based on an averaging of pixel values within the block. With a directional prediction mode, prediction is performed based on a neighboring block's reconstructed pixels along a particular direction (as indicated by the mode). In general, the tail end of the arrows shown in FIG. 4 represents a relative one of neighboring pixels from which a value is retrieved, while the head of the arrows represents the direction in which the retrieved value is propagated to form a predictive block.

The intra-modes shown in FIG. 4 may be used for predicting depth values. For example, each of the angular intra-prediction modes shown in FIG. 4 may be associated with a set of Wedgelet patterns, as described in greater detail below with respect to FIGS. 5A and 5B.

Figure 5A:
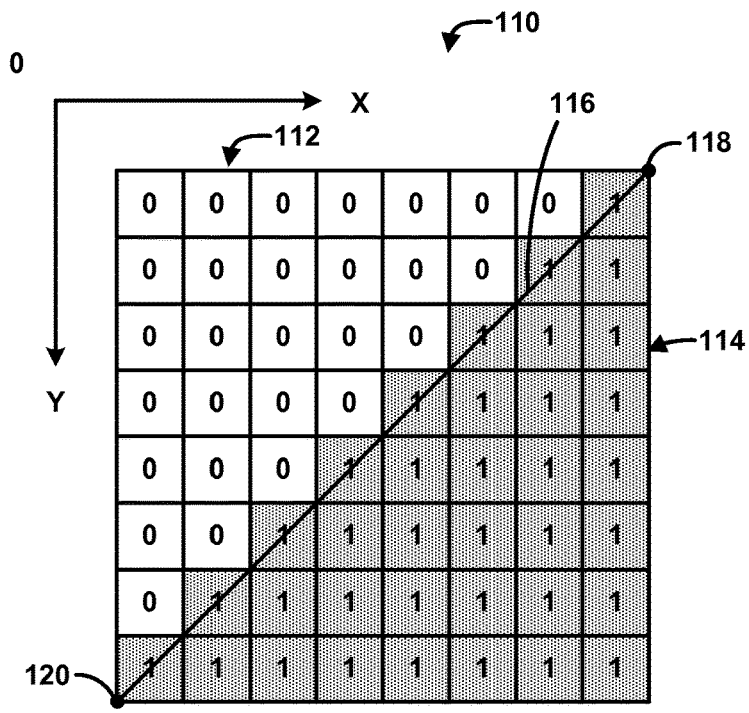
FIGS. 5A and 5B are conceptual diagrams illustrating examples of depth modeling modes (DMMs).
Figure 5B:
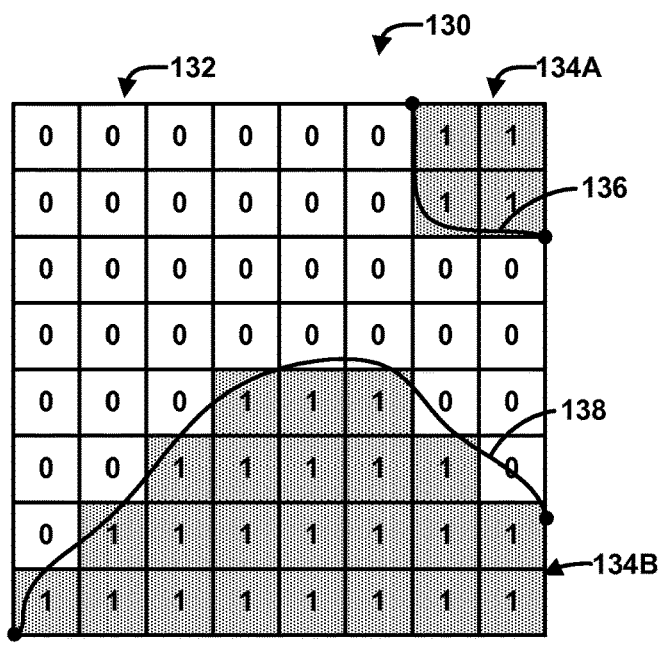

FIGS. 5A and 5B are conceptual diagrams illustrating examples of depth modeling modes (DMMs). FIG. 5A, for example, illustrates depth block 110 that is partitioned using Wedgelet partitioning, and FIG. 5B, as another example, illustrates depth block 130 that is partitioned using Contour partitioning. 3D-HEVC includes techniques for depth modeling modes (DMMs) for partitioning blocks along with the intra-prediction modes to code an intra-prediction unit of a depth slice. HTM version 3.1 applies a DMM method for intra coding of depth maps, which may better represent sharper edges in depth maps in some cases.

For example, 3D-HEVC provides four DMM modes: Mode 1 (explicit Wedgelet signaling), Mode 2 (intra-predicted Wedgelet partitioning), Mode 3 (inter-component Wedgelet partitioning), and Mode 4 (inter-component Contour partitioning). In all four modes, a video coder, such as video encoder 20 or video decoder 30, may partition a depth block into two regions specified by a DMM pattern, where each region is represented by a constant value. The DMM pattern can be either explicitly signaled (mode 1), predicted by spatially neighboring blocks (mode 2), or predicted using a co-located texture block (mode 3 and mode 4).

There are two partitioning models defined in DMM, including Wedgelet partitioning and the Contour partitioning. Again, FIG. 5A illustrates an example of Wedgelet partitioning, and FIG. 5B illustrates an example of Contour partitioning. Each individual square within depth blocks 110 and 130 represents a respective individual pixel of depth blocks 110 and 130, respectively. Numeric values within the squares represent whether the corresponding pixel belongs to region 112 (value "0" in the example of FIG. 5A) or region 114 (value "1" in the example of FIG. 5A). Shading is also used in FIG. 5A to indicate whether a pixel belongs to region 112 (white squares) or region 114 (grey shaded squares).

Each pattern (that is, both Wedgelet and Contour) may be defined by an array of size $u_B \times v_B$ binary digit labeling of whether the corresponding sample (that is, pixel) belongs to region $P_1$ or $P_2$ (where $P_1$ corresponds to region 112 in FIG. 5A and region 132 in FIG. 5B, and $P_2$ corresponds to region 114 in FIG. 5A and region 134A, 134B in FIG. 5B), where $u_B$ and $v_B$ represent the horizontal and vertical size of the current PU, respectively. In the examples of FIG. 5A and FIG. 5B, the PU corresponds to blocks 110 and 130, respectively. Video coders, such as video encoder 20 and video decoder 30, may initialize Wedgelet patterns at the beginning of coding, e.g., the beginning of encoding or the beginning of decoding.

As shown in the example of FIG. 5A, for a Wedgelet partition, depth block 110 is partitioned into two regions, region 112 and region 114, by straight line 116, with start point 118 located at (Xs, Ys) and end point 120 located at (Xe, Ye). In the example of FIG. 5A, start point 118 may be defined as point (8, 0) and end point 120 may be defined as point (0, 8).

As shown in the example of FIG. 5B, for Contour partitioning, a depth block, such as depth block 130, can be partitioned into two irregularly-shaped regions. In the example of FIG. 5B, depth block 130 is partitioned into region 132 and region 134A, 134B. Although pixels in region 134A are not immediately adjacent to pixels in region 134B, regions 134A and 134B are defined to form one single region, for the purposes of predicting a PU of depth block 130. The Contour partitioning is more flexible than the Wedgelet partitioning, but may be relatively more difficult to signal. In DMM mode 4, in the case of 3D-HEVC, Contour partitioning pattern is implicitly derived using reconstructed luma samples of the co-located texture block.

In this manner, a video coder, such as video encoder 20 and video decoder 30, may use line 116, as defined by start point 118 and end point 120, to determine whether a pixel of depth block 110 belongs to region 112 (which may also be referred to as region "P$_1$") or to region 114 (which may also be referred to as region "P$_2$"). Likewise, a video coder may use lines 136, 138 of FIG. 5B to determine whether a pixel of depth block 130 belongs to region 132 (which may also be referred to as region "P$_1$") or to region 134 (which may also be referred to as region "P$_2$"). Regions "P1" and "P2" are default naming conventions for different regions partitioned according to DMM, and thus, region P$_1$ of depth block 110 should not be considered the same region as region P$_1$ of depth block 130.

As noted above, each of the DMMs may be defined by whether the DMM uses Wedgelet or Contour partitioning, and whether the pattern is explicitly signaled or implicitly determined. The DMM process may be integrated as an alternative to the intra prediction modes specified in HEVC (shown in FIG. 4). A one bit flag may be signaled for each PU to specify whether DMM or conventional intra prediction is applied.

Figure 6:
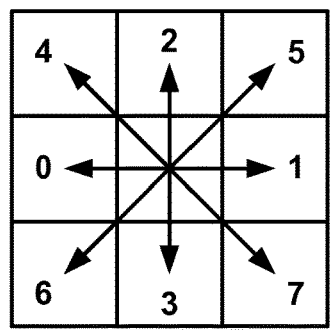
FIG. 6 is a conceptual diagram illustrating a region boundary chain coding mode.
Figure 6:
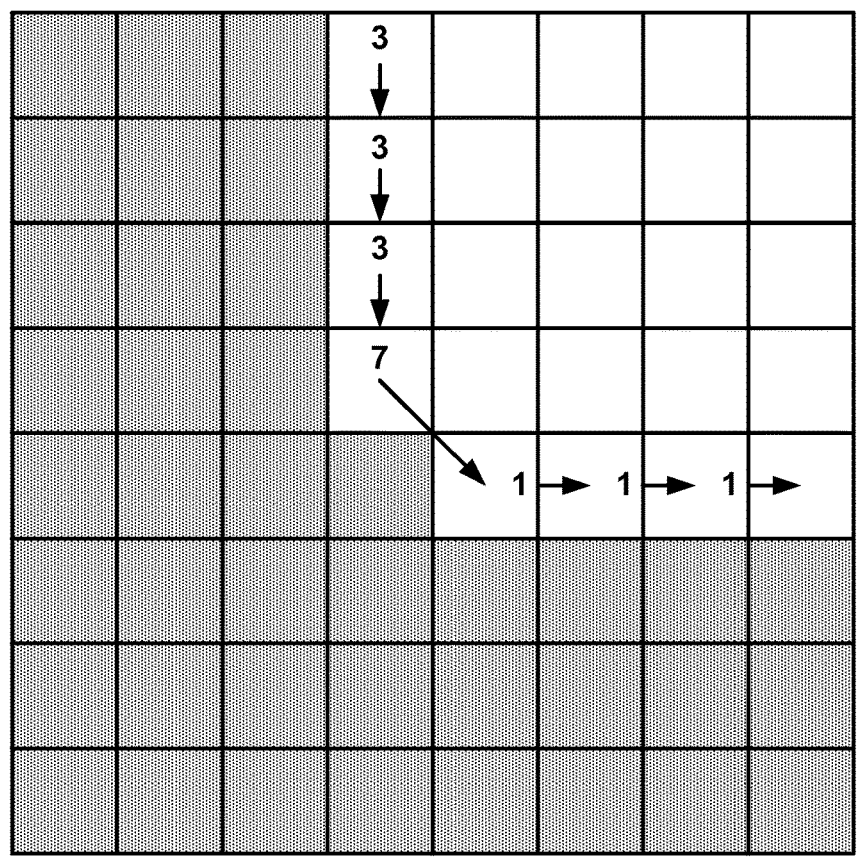

FIG. 6 is a conceptual diagram illustrating a region boundary chain coding mode. For example, 3D-HEVC includes a region boundary chain coding mode that allows explicit signaling of partition boundaries (e.g., rather than partitioning based on co-located texture, as described above with respect to DMMs). This disclosure may refer to "region boundary chain coding mode" as "chain coding."

In general, a chain is a connection between a sample and one of its eight-connectivity samples. As shown at the top of FIG. 6, there are eight different chain direction types, each assigned with a direction index ranging from 0 to 7. A video encoder (such as video encoder 20) may signal a chain for a PU with a starting position of the chain, an indication of a number of links in the chain (e.g., a number of chain codes), and for each chain code, a direction index.

One example of the chain coding process is illustrated in FIG. 6. To signal the arbitrary partition pattern shown in FIG. 6, video encoder 20 may identify the partition pattern and encode the following information in an encoded bitstream: one bit "0" is encoded to signal that the chains start from the top boundary; three bits "011" are encoded to signal the starting position "3" at the top boundary; four bits "0110" are encoded to signal the total number of chains as 7; a series of connected chains indexes "3, 3, 3, 7, 1, 1, 1" are encoded, where each chain index is converted to a code word using the table shown at the relative top of FIG. 6.

A video decoder, such as video decoder 30, may parse the signaling described above to determine the partitioning pattern of a block. Video decoder 30 may then decode depth values for each partition.

Figure 7:
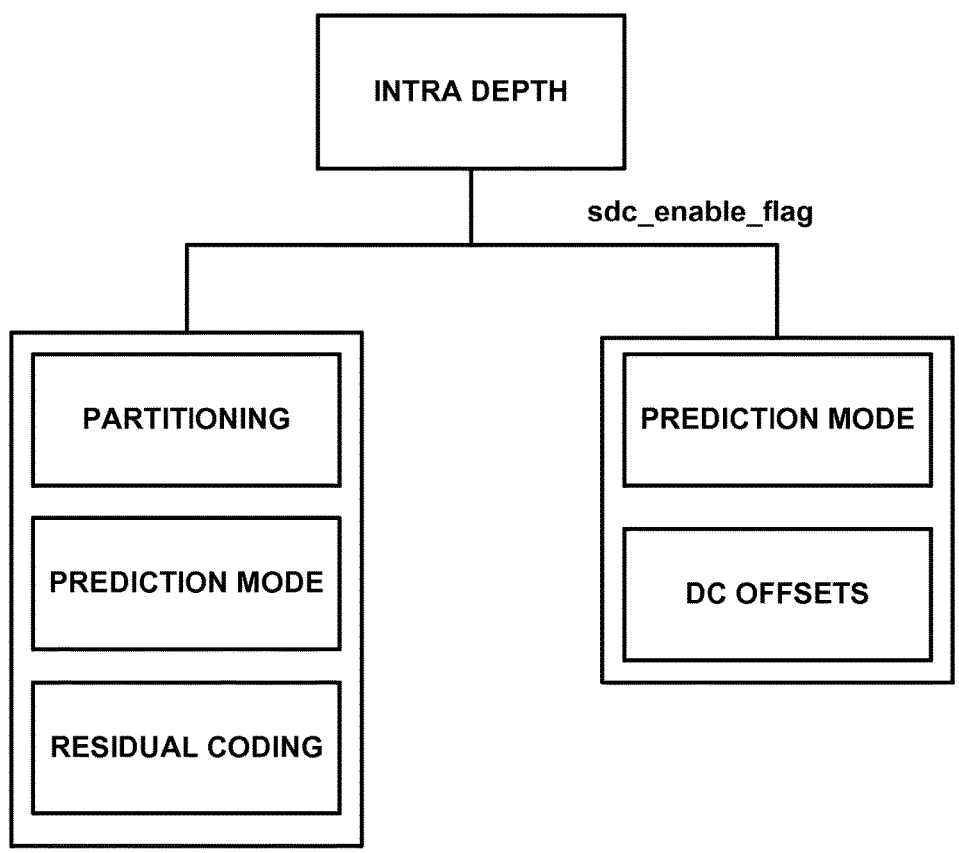
FIG. 7 is a block diagram illustrating intra-coding depth information using simplified depth coding (SDC).

FIG. 7 is a block diagram illustrating intra-coding depth information using simplified depth coding (SDC). The examples described below with respect to FIG. 7 may be performed by video encoder 20, video decoder 30, or a variety of other codecs and/or processors.

In the example of FIG. 7, as noted above, a video coder (such as video encoder 20 or video decoder 30) may use any of the intra-prediction modes described above (HEVC modes, DMMs, chain coding) to intra-predict depth information. In such examples, the video coder may implement the left branch of FIG. 7 (e.g., partitioning, prediction mode, and residual coding).

Alternatively, the video coder may signal a syntax element (e.g., a sdc_enable_flag) to indicate that depth information is coded using SDC. When implementing SDC, the video coder may also indicate a prediction mode and DC offsets for the depth values, as illustrated in the right branch of FIG. 7. In the current 3D-HEVC (version 5.1 as noted above), SDC is only applied for a 2N×2N PU partition size. As noted above, instead of coding quantized transform coefficients, SDC modes represent a depth block with the following four types of information:

1. The type of partition of the current depth block, including
   a. DC (1 partition)
   b. DMM mode 1 (2 partitions)
   c. DMM mode 2 (2 partitions)
   d. Planar (1 partition)
2. For each partition, a residual value (in the pixel domain) is signaled in the bitstream.

Accordingly, the four sub-modes defined in SDC include SDC mode 1, SDC mode 2, SDC mode 3 and SDC mode 4, which correspond to the partition type of DC, DMM mode 1, DMM mode 2 and Planar, respectively. In SDC, no transform or quantization is applied. To signal the residual value of each partition, video encoder 20 may apply two alternative processes. In a first process, video encoder 20 directly codes the residual value of each partition, which may be calculated by subtracting the generated predictor (Pred) of neighboring samples from the average value (Aver) of current partition in the current PU.

In a second process, instead of directly coding the residual value, video encoder 20 may encode an index difference that has been mapped from a DLT. For example, as noted above, a DLT maps depth values of an original depth map. The DLT may be constructed by analyzing the frames within an intra period before encoding a full sequence. In some examples, video encoder 20 sorts all valid depth values in ascending order and inserts the depth values into the DLT such that the depth values have increasing indexes in the DLT.

Video encoder 20 calculates the index difference, noted above, by subtracting the index of a predictor, e.g., predictive depth value (Pred), from the index of an average value of depth values of the current block (Aver). When the value of Pred or Aver is not included in a DLT, video encoder 20 may map the value to an index i of the DLT having the relatively closest value to the actual Pred ro Aver value (e.g., the index corresponding to the depth value where the absolute value of Pred/Aver minus the value of the i-th entry in DLT is at a minimum).

Video decoder 30 may receive the index value and determine the index of the predictor in the same manner as video encoder 20. Video decoder 30 may then combine the index of the predictor and the index difference to determine an index for the depth value currently being decoded. Video decoder 30 may determine the depth value using the determined index and a received DLT.

In some instances, using a DLT may be optional and may not be used if more than half the values from 0 to MAX_DEPTH_VALUE (e.g., 255 for 8-bit depth samples) appear in the original depth map at the analysis step. When using a DLT, in general, the DLT may be coded in sequence and/or video parameter set. In order to code a DLT, a video coder (such as video encoder 20 or video decoder 30) may initially code the number of valid depth values in the DLT with an Exp-Golomb code. The video coder may then code each valid depth value with an Exp-Golomb code. One example of the related syntax elements and semantics for signaling a DLT are shown in Table 1 below:

TABLE 1

| | Descriptor |
|---|---|
| vps_extension( ) { | |
| ... | |
|   for( i = 0; i <= vps_max_layers_minus1; i++ ) { | |
|     if ( (i ! = 0) && !( i % 2 ) ) { | |
|       multi_view_mv_pred_flag[ i ] | u(1) |
|       multi_view_residual_pred_flag[ i ] | u(1) |
|     } | |
|     if ( i % 2 ) { | |
|       enable_dmm_flag[ i ] | u(1) |
|       use_mvi_flag[ i ] | u(1) |
|       lim_qt_preq_flag[ i ] | u(1) |
|       dlt_flag[ i ] | u(1) |
|       if( dlt_flag[ i ] ) { | |
|         num_depth_values_in_dlt[ i ] | ue(v) |
|         for (j = 0; j < num_depth_values_in_dlt[ i ] ; j++) { | |
|           dlt_depth_value[ i ][ j ] | ue(v) |
|         } | |
|       } | |
|     } | |
|   } | |
| } | |

In the example of Table 1 above, dlt_flag[i] equal to 1 specifies that a DLT is used and that residual values for simplified depth coded coding units are to be interpreted as indices of the DLT for depth view components with layer_id equal to i. In addition, dlt_flag[i] equal to 0 specifies that DLT is not used and residual values for simplified depth coded coding units are not to be interpreted as indices for depth view components with layer_id equal to i. When dlt_flat[i] is not present, it may be inferred to be equal to 0.

In addition, in the example of Table 1 above, num_depth_values_in_dlt[i] specifies the number of different depth values and the number of elements in the DLT for depth view components of the current layer with layer_id equal to i. In addition, dlt_depth_value[i][j] specifies the j-th entry in the DLT for depth view components with layer_id equal to i. In the current 3D-HTM (version 5.1, noted above), a DLT may be signaled in an SPS instead of a VPS as defined above.

The DLT scheme described above may include a variety of redundancy, which may impact coding efficiency. To illustrate potential redundancy, an example test sequence is provided below:

Sequence name: balloons
    dlt_depth_value[0][38]={58, 64, 69, 74, 80, 85, 90, 96, 101, 106, 112, 117, 122, 128, 133, 138, 143, 149, 154, 159, 165, 170, 175, 181, 186, 191, 197, 202, 207, 213, 218, 223, 228, 234, 239, 244, 250, 255};
    dlt_depth_value[1][48]={1, 4, 5, 11, 21, 27, 32, 37, 43, 48, 53, 58, 64, 69, 74, 80, 85, 90, 96, 101, 106, 112, 117, 122, 128, 133, 138, 143, 149, 154, 159, 165, 170, 175, 181, 186, 191, 197, 202, 207, 213, 218, 223, 228, 234, 239, 244, 250, 255};
    dlt_depth_value[2][44]={2, 25, 27, 37, 43, 48, 53, 58, 64, 69, 74, 80, 85, 90, 96, 101, 106, 112, 117, 122, 128, 133, 138, 143, 149, 154, 159, 165, 170, 175, 181, 186, 191, 197, 202, 207, 213, 218, 223, 228, 234, 239, 244, 250, 255};

As shown in the test sequence above, there are many redundant (same) depth values that appear in more than one view (bold and italicized numbers above). In addition, the range of depth values of the DLT is relatively large (e.g., with a minimum range of 58 to 255). Another example test sequence is provided below:

Sequence name: PoznanHall2
    dlt_depth_value[0][39]={0, 3, 5, 8, 10, 13, 15, 18, 20, 23, 25, 28, 30, 33, 35, 38, 40, 43, 45, 48, 50, 53, 55, 58, 60, 63, 65, 68, 70, 73, 75, 78, 80, 83, 85, 88, 90, 93, 95};
    dlt_depth_value[1][35]={3, 5, 8, 10, 13, 15, 18, 20, 23, 25, 28, 30, 33, 35, 38, 40, 43, 45, 48, 50, 53, 55, 58, 60, 63, 65, 68, 70, 73, 75, 78, 80, 83, 85, 88};
    dlt_depth_value[2][36]={0, 3, 5, 8, 10, 13, 15, 18, 20, 23, 25, 28, 30, 33, 35, 38, 40, 43, 45, 48, 50, 53, 55, 58, 60, 63, 65, 68, 70, 73, 75, 78, 80, 83, 85, 88};

Again, as shown in the test sequence above, there are many redundant (same) depth values that appear in more than one view (bold and italicized numbers above). In addition, the range of depth values of the DLT is relatively large (e.g., with a minimum range of 3 to 88).

As noted above, directly coding depth values without considering the ascending characteristics of depth values may be inefficient. In addition, the relationship between different views is not utilized in current design (version 5.1, noted above). Accordingly, a relatively large number of bits may be wasted on signaling redundant depth values. Moreover, signaling a DLT in either an SPS or a VPS may not be efficient when there are scene changes within one sequence/view. In addition, exp-Golomb codes may be inefficient when coding depth values, because there is no assumption that the depth values with shorter codes have a higher probability of occurrence.

Aspects of this disclosure generally relate to DLT signaling, and while not limited to any particular standard, may be used in 3D-HEVC. According to aspects of this disclosure, one or more depth values of a DLT may be coded relative to one or more other depth values of the DLT. For example, assume that one depth value with the j-th entry in the DLT for depth view components with layer_id equal to i is denoted by dlt_D[i][j]. In an example, video encoder 20 may directly signal the first valid depth value (e.g., dlt_D[i][0]) and may apply differential coding to the following depth values by comparing a depth value being coded to the previous depth value in the DLT (e.g., dlt_D[i][j]–dlt_D[i][j–1]). Video decoder 30 may receive the first depth value and reconstruct the DLT using the received differential values, e.g., by adding a differential value of the depth value being decoded to the previous depth value of the DLT.

In one example, video encoder 20 may perform DLT signaling for different views in the same way. That is, in this example, video encoder 20 and video decoder 30 do not apply inter-view prediction for DLTs. Also, video encoder 20 and video decoder 30 do not perform slice/frame-level prediction between DLTs. Example VPS syntax for this example is shown in Table 2 below:

TABLE 2

| G.7.3.2.1.1 Video parameter set extension syntax | |
|---|---|
| | Descriptor |
| vps_extension( ) } | |
| ... | |
|   if ( i % 2 ) { | |
|     enable_dmm_flag[ i ] | u(1) |
|     use_mvi_flag[ i ] | u(1) |
|     lim_qt_pred_flag[ i ] | u(1) |
|     dlt_flag[ i ] | u(1) |
|     if( dlt_flag[ i ] ) { | |
|       num_depth_values_in_dlt[ i ] | [removed: "ue(v)"] u(v) |
|       dlt_depth_start_value[ i ] | ue(v) |

TABLE 2-continued

| G.7.3.2.1.1 Video parameter set extension syntax | |
|---|---|
| | Descriptor |
|     for ( j = 1; j < num_depth_values_in_dlt[ i ]; j++) | |
|     { | |
|         dlt_depth_value_diff[ i ][ j ] | ue(v) |
|     } | |
|   } | |
| } | |
| ... | |

In the example of Table 2 above, the italicized elements indicate departures from the current syntax described above with respect to Table 1 (and [removed: " . . . "] indicates removal of material). In the example of Table 2, num_depth_values_in_dlt[i] specifies the number of different depth values and the number of elements in the DLT for depth view components of the current layer with layer_id equal to i. In addition, dlt_depth_start_value[i] specifies the 0-th entry in the DLT for depth view components with layer_id equal to i.

While the example of Table 2 shows dlt_depth_start_value[i] being coded with u(v), in some examples, the syntax element can be signaled as fixed length, e.g., u(7) or signaled as u(v) with a range from 0 to 255, or signaled as u(v) with a range from 0 to (255−num_depth_values_in_dlt[i]). In another example, dlt_depth_start_value_minus1[i] may be signaled instead of dlt_depth_start_value[i] where dlt_depth_start_value_minus1[i] plus 1 specifies the 0-th entry in the DLT for depth view components with layer_id equal to i.

In addition, according to aspects of this disclosure, dlt_depth_value_diff[i][j] specifies the difference of depth value between the j-th entry and the (j−1)-th entry in the DLT for depth view components with layer_id equal to i and j larger than 0. dltDepthValue[i][j] indicates the j-th entry in the DLT for depth view components with layer_id equal to i and is derived as follows:

if j is equal to 0, the dltDepthValue[i][j] is set equal to dlt_depth_start_value[i], otherwise, dltDepthValue[i][j] is set equal to dltDepthValue[i][j−1]+dlt_depth_value_diff[i][j].

In another example, dlt_depth_value_diff_minus1[i][j] may be signaled instead of dlt_depth_value_diff[i][j], where dlt_depth_value_diff_minus1[i][j] plus 1 specifies the difference of depth values between the j-th entry and the (j−1)-th entry in the DLT for depth view components with layer_id equal to i and j larger than 0.

In some examples, according to aspects of this disclosure, the range of any difference value between two consecutive entries of the DLT is signaled and the difference values are signaled with fixed length depending on the range. That is, DLT differences may be signaled based on a maximum difference value or minimum difference value.

In some examples, dlt_depth_value_diff[i][j] or dlt_depth_value_diff_minus1[i][j] may be signaled with u(v) instead of ue(v) and the range of this syntax element is signaled. Example VPS syntax for this example is shown in Table 3 below:

TABLE 3

| | Descriptor |
|---|---|
| vps_extension( ) { | |
| ... | |
|   if( i % 2 ) { | |
|     enable_dmm_flag[ i ] | u(1) |

TABLE 3-continued

| | Descriptor |
|---|---|
|     use_mvi_flag[ i ] | u(1) |
|     lim_qt_pred_flag[ i ] | u(1) |
|     dlt_flag[ i ] | u(1) |
|     if( dlt_flag[ i ] ) { | |
|         num_depth_values_in_dlt[ i ] | [removed: "ue(v)"] u(8) |
|         dlt_depth_start_value[ i ] | u(v) |
|         max_diff_minus1 [ i ] | u(5) |
|         for ( j = 1; j < (num_depth_values_in_dlt[ i ]) ; j++) { | |
|             dlt_depth_value_diff_minus1 [ i ][ j ] | u(v) |
|         } | |
|     } | |
| ... | |

In the example of Table 3 above, the italicized elements indicate departures from the current syntax described above with respect to Table 1 (and [removed: " . . . "] indicates removal of material). In the example of Table 3, max_diff_minus1[i] specifies the range of the dlt_depth_value_diff_minus1[i][j]. That is, max_diff_minus1[i] provides an indication of the maximum numerical difference between two consecutive depth values in the DLT. In addition, dlt_depth_value_diff_minus1[i][j] plus 1 specifies the difference of depth value between the j-th entry and the (j−1)-th entry in the DLT for depth view components with layer_id equal to i. dlt_depth_value_diff_minus1 is in the range of 0 to max_diff_minus1[i], inclusive. In other examples, num_depth_values_in_dlt[i] and dlt_depth_start_value[i] may be coded as ue(v), or both coded as u(8) or u(v) with different given ranges.

In some examples, differential coding is applied to the differences of two consecutive depth values, i.e., second order difference is signaled. That is, when j is larger than 1, (dlt_D[i][j]−dlt_D[i][j−1])−(dlt_D[i][j−1]−dlt_D[i][j−2]) is signaled. When j is equal to 1, (dlt_D[i][j]−dlt_D[i][j−1]) is signaled. Example VPS syntax for this example is shown in Table 4 below:

TABLE 4

| | Descriptor |
|---|---|
| vps_extension( ) { | |
| ... | |
|   if ( i % 2 ) { | |
|     enable_dmm_flag[ i ] | u(1) |
|     use_mvi_flag[ i ] | u(1) |
|     lim_qt_pred_flag[ i ] | u(1) |
|     dlt_flag[ i ] | u(1) |
|     if( dlt_flag[ i ] ) { | |
|         num_depth_values_in_dlt[ i ] | [removed: "ue(v)"] u(v) |
|         dlt_depth_start_value[ i ] | u(v) |
|         for ( j = 1; j < num_depth_values_in_dlt[ i ]; j++) { | |
|             dlt_depth_value_consecutive_diff[ i ][ j ] | [removed: "ue(v)"] −se(v) |
|         } | |
|     } | |
|   } | |
| ... | |

In the example of Table 4 above, the italicized elements indicate departures from the current syntax described above with respect to Table 1 (and [removed: " . . . "] indicates removal of material). In the example of Table 4, dlt- _depth_value_consecutive_diff[i][j] specifies the second order difference of the j-th entry from the difference of depth value and the (j−1)-th entry in the DLT for depth view components with layer_id equal to i. dltDepthValueDiff[i][j] indicates the difference of depth value between the j-th entry and the (j−1)-th entry in the DLT for depth view components with layer_id equal to i and is derived as follows:

when j is equal to 1, dltDepthValueDiff[i][j] is set to dlt_depth_value_consecutive_diff[i][1], otherwise (when j is larger than 1 and smaller than num_depth_values_in_dlt[i]), dltDepthValueDiff[i][j] is set to dltDepthValueDiff[i][j−1]+dlt_depth_value_consecutive_diff[i][j].

In addition, dltDepthValue[i][j] indicates the j-th entry in the DLT for depth view components with layer_id equal to i and is derived as follows:

if j is equal to 0, the dltDepthValue[i][j] is set equal to dlt_depth_start_value[i], otherwise, dltDepthValue[i][j] is set equal to dltDepthValue[i][j−1]+dltDepthValueDiff[i][j].

In some examples, the range of dlt_depth_value_consecutive_diff[i][j] may be explicitly signaled when j is larger than 1. Example VPS syntax for this example is shown in Table 5 below:

TABLE 5

|  | Descriptor |
|---|---|
| vps_extension( ) { |  |
| ... |  |
| if ( i % 2 ) { |  |
|   enable_dmm_flag[ i ] | u(1) |
|   use_mvi_flag[ i ] | u(1) |
|   lim_qt_pred_flag[ i ] | u(1) |
|   dlt_flag[ i ] | u(1) |
|   if( dlt_flag[ i ] ) { |  |
|     num_depth_values_in_dlt[ i ] | [removed: "ue(v)"] u(v) |
|     dlt_depth_start_value[ i ] | u(v) |
|     dlt_depth_start_value_diff[ i ] | u(v) |
|     max_consecutive_diff_minus1[ i ] | u(v) |
|     for ( j = 2; j < num_depth_values_in_dlt[ 0 ]; j++) { |  |
|       dlt_depth_value_consecutive_diff_abs[ i ] | [removed: "ue(v)"] u(v) |
|       if(dlt_depth_value_consecutive_diff_abs[ i ][ j ]) |  |
|         dlt_depth_value_consecutive_diff_sign[ i ][ j ] | u(1) |
|     } |  |
|   } |  |
| } |  |
| ... |  |

In the example of Table 5 above, the italicized elements indicate departures from the current syntax described above with respect to Table 1 (and [removed: " . . . "] indicates removal of material). In the example of Table 5, dlt_depth_start_value_diff[i] specifies the difference of depth value between the j-th entry and the (j−1)-th entry in the DLT for depth view components with layer_id equal to i and j equal to 1. In addition, dlt_depth_start_value_diff[i] is in the range of 0 to (256−num_depth_values_in_dlt[i]−dlt_depth_start_value[i]), inclusive.

In addition, max_consecutive_diff_minus1[i] plus 1 specifies the range of the dlt_depth_value_consecutive_diff_abs [i][j]. max_consecutive_diff_minus1[i] is in the range of 0 to (256−num_depth_values_in_dlt[i]−dlt_depth_start_value[i]), inclusive.

In addition, dlt_depth_value_consecutive_diff_abs[i][j] specifies the absolute value of the second order difference of the j-th entry from the difference of depth value and the (j−1)-th entry in the DLT for depth view components with layer_id equal to i. In addition, dlt_depth_value_consecutive_diff_abs is in the range of 0 to (max_consecutive_diff_minus1[i]+1), inclusive.

In some examples, a max_consecutive_diff[i] syntax element may be substituted for the max_consecutive_diff_minus1[i] plus 1 syntax element. In such examples, max_consecutive_diff[i] specifies the range of the dlt_depth_value_consecutive_diff_abs[i][j]. In some instances, max_consecutive_diff[i] may be in the range of 0 to (256−num_depth_values_in_dlt[i]−dlt_depth_start_value [i]), inclusive. In addition, dlt_depth_value_consecutive_diff_abs may be in the range of 0 to max_consecutive_diff [i], inclusive. In addition, dlt_depth_value_consecutive_diff_sign[i][j] specifies the sign value of the second order difference of the j-th entry from the difference of depth value and the (j−1)-th entry in the DLT for depth view components with layer_id equal to i when dlt_depth_value_consecutive_diff_abs[i][j] is unequal to 0.

In addition, dltDepthValueDiff[i][j] indicates the difference of depth value between the j-th entry and the (j−1)-th entry in the DLT for depth view components with layer_id equal to i and may be derived as follows:

when j is equal to 1, dltDepthValueDiff[i][j] is set to dlt_depth_start_value_diff[i], otherwise (when j is larger than 1 and smaller than num_depth_values_in_dlt[i]), dltDepthValueDiff[i][j] is set to dltDepthValueDiff[i][j−1]+(1−2*dlt_depth_value_consecutive_diff_sign[i][j])*dlt_depth_value_consecutive_diff_abs[i][j].

In addition, dltDepthValue[i][j] indicates the j-th entry in the DLT for depth view components with layer_id equal to i and may be derived as follows:

if j is equal to 0, the dltDepthValue[i][j] is set equal to dlt_depth_start_value[i], otherwise, dltDepthValue[i][j] is set equal to dltDepthValue[i][j−1]+dltDepthValueDiff[i][j].

According to aspects of this disclosure, rather than signaling individual depth value differences, as noted above, one or more syntax elements (e.g., a flag) may be introduced to indicate whether all the differences between consecutive entries of a DLT are the same. For example, if all of the differences between consecutive depth values of a DLT is the same (e.g., a difference of 1, 2, 3, or the like) a flag may be used to indicate that the differences are consistent, and the difference value to be applied between depth values is signaled. In this way, rather than signaling a set of depth difference values that are all the same, this technique may be implemented to reduce signaling costs.

An example of a flag that indicates whether all the differences between the j-th entry and the (j−1)-th entry are the same, as well as the value of the difference is shown in Table 6 below:

TABLE 6

|  | Descriptor |
|---|---|
| vps_extension( ) { |  |
| ... |  |
| if ( i % 2 ) { |  |
|   enable_dmm_flag[ i ] | u(1) |
|   use_mvi_flag[ i ] | u(1) |
|   lim_qt_pred_flag[ i ] | u(1) |

TABLE 6-continued

| | Descriptor |
|---|---|
| dlt_flag[ i ]<br>if( dlt_flag[ i ] ) {<br>  num_depth_values_in_dlt[ i ]<br><br>  dlt_depth_start_value[ i ]<br>  dlt_depth_delta_equal_flag[ i ]<br>  if( dlt_depth_delta_equal_flag[ i ] )<br>    dlt_depth_detla_value[ i ]<br>  else {<br>    for ( j = 1; j < num_depth_values_in_dlt[ i ]; j++) {<br>      dlt_depth_value_diff_minus1 [ i ][ j ]<br>    }<br>  }<br>}<br>... | u(1)<br><br>[removed:<br>"ue(v)"]<br>u(v)<br>u(v)<br>u(1)<br><br>u(v)<br><br><br>u(v) |

In the example of Table 6 above, the italicized elements indicate departures from the current syntax described above with respect to Table 1 (and [removed: " . . . "] indicates removal of material). The italicized elements indicate departures from the current syntax described above. In the example of Table 6, dlt_depth_delta_equal_flag[i] equal to 1 indicates all the differences between the depth value in the (j+1)-th entry and the one in the j-th entry are the same. In addition, dlt_depth_delta_equal_flag[i] equal to 0 indicates not all the differences between the depth value in the (j+1)-th entry and the one in the j-th entry are the same.

In addition, dlt_depth_delta_value[i] indicates the difference between two depth values with consecutive entries, i.e., (j+1)-th entry and the j-th entry. dlt_depth_delta_value[i] is in the range of 0 to ((256-dlt_depth_start_value[i])/num_depth_values_in_dlt[i]), inclusively. The dlt_depth_delta_value[i] is present when dlt_depth_delta_equal_flag[i] is equal to 1. In other examples, dlt_depth_delta_value[i] is signaled as u(7) or u(8).

In addition, dltDepthValue[i][j] indicates the j-th entry in the DLT for depth view components with layer_id equal to i and is derived as follows:
  if j is equal to 0, the dltDepthValue[i][j] is set equal to dlt_depth_start_value[i],
  otherwise, dltDepthValue[i][j] is set equal to dltDepthValue[i][j−1]+dlt_depth_value_diff[i][j] when dlt_depth_delta_equal_flag[i] is equal to 0, and dltDepthValue[i][0]+dlt_depth_delta_value[i]*j when dlt_depth_delta_equal_flag[i] is equal to 1.

The examples shown and described with respect to Tables 2-6 above generally relate to prediction of depth values within the same DLT. By predicting one or more values of a DLT, the range of values associated with DLTs (and the bits required to signal such values) may be reduced. That is, for example, rather than signaling a range of 0-255 depth values, relatively smaller depth difference values may be signaled.

According to other aspects of this disclosure, the DLT of one view may be used to predict the other view, referred to herein as inter-view DLT prediction. In one example, video encoder 20 may encode (and video decoder 30 may decode) an indication of which consecutive entries of a DLT of a reference view are the same as consecutive entries (with possible shift) of a DLT another view. That is, the location of equal depth values may be indicated using one or more syntax elements.

In one example, a flag may be signaled to indicate a starting position of the first entry of a DLT that is the same as another DLT. In some examples, the default starting position may be equal to 0 or equal to the maximum entry of a DLT of a base view. For example, assume a base view has a first set of depth values in a DLT, and a non-base view has all of the depth values of the base view, as well as additional values that are less than the depth values of the base view. If all newly added depth values are less than the first entry of DLT in the base view, the starting position may be signaled by setting the flag equal to zero.

In another example, assume a base view has a first set of depth values in a DLT, and a non-base view has all of the depth values of the base view, as well as additional values that are greater than the depth values of the base view. If all newly added depth values are larger than the last entry of the DLT of the base view, the flag equal to one is signaled as the starting position.

In other examples, one or more syntax element pairs may be used to indicate the overlapping depth values between views. For example, such syntax elements may indicate a starting position of the overlapping depth values and the number of depth values to be inserted (the number of overlapping depth values). After all of the depth values for the DLTs have been signaled (e.g., the sum of the number of depth values signaled in all pairs is equal to the difference of depth values between non-base and base views) the signaling process may be terminated.

In still other examples, one or more syntax elements (e.g., a flag) may be initially signaled to indicate whether all of the newly added depth values are smaller (or larger) than the minimum (or maximum) depth values. If the additional depth values are not all less than or greater than the depth values from the DLT being used for prediction, an indication of the number of pairs of syntax elements (indicating the start/end of overlapping depth values) may be initially signaled. In some examples, when the number of pairs of syntax elements is signaled, the number of the depth values in the last pair is not signaled.

In any of the examples above, the non-overlapping depth values (that is, the depth values that do not appear in more than one DLT) may be signaled using the differential DLT signaling described above.

As noted above, a base view and non-base views may have different numbers of depth values in their respective DLTs. For example, the number of depth values the base view may be smaller than the number of depth values in the non-base view. When the number of different depth values in a non-base view is smaller than that of the base view, a default starting position of the DLT of the base view is signaled to indicate the position of the first valid depth value in the non-base view. In some examples, as noted above, one or more syntax element pairs (e.g., indicating a starting position and number of depth values to be copied associated with current starting position) may be signaled. After the sum of the number of depth values signaled in all pairs is equal to the depth values in the non-base and base view, the signaling process may be terminated.

In some examples, one or more syntax elements (e.g., a flag) may be initially signaled to indicate whether all depth values are able to be copied from consecutive entries of the DLT of the base view. If all of the depth values of the base view DLT cannot be copied to a non-base view, the number of syntax element pairs may be initially signaled. In some examples, when the number of pairs of syntax elements is signaled, the number of the depth values to be copied in the last pair is not signaled. In some examples, the difference of the numbers of different depth values (e.g., the number of elements in the DLT) between a non-base view and a base view is signaled.

Accordingly, according to aspects of this disclosure, intra-DLT prediction may be used to reduce the amount of data required to signal a DLT of one view, and inter-view DLT prediction may be used, additionally or alternatively, to reduce the amount of data required to signal DLTs of other views.

In some examples, for inter-view DLT prediction, when the number of valid depth values of a non-base view is larger than that of the base view, all the newly added depth values are inserted either before the first entry or after the last entry of the DLT in base view. In other examples, when the number of valid depth values of a non-base view is smaller than that of the base view, all the depth values that are copied from the DLT in base view have consecutive entries of the DLT in base view.

Example VPS syntax for an example of inter-view DLT prediction is shown in Table 7 below:

TABLE 7

| | Descriptor |
|---|---|
| vps_extension( ) { | |
| ... | |
|   if ( i % 2 ) { | |
|     enable_dmm_flag[ i ] | u(1) |
|     use_mvi_flag[ i ] | u(1) |
|     lim_qt_pred_flag[ i ] | u(1) |
|     dlt_flag[ i ] | u(1) |
|     if ( dlt_flag[ i ] ) { | |
|       if (i != 1) | |
|         inter_view_dlt_pred_enable_flag[ i ] | u(1) |
|       if (i = = 1 \|\| !inter_view_dlt_pred_enable_flag[ i ] ) { | |
|         ... | |
|       } | |
|       else { | |
|         num_depth_values_in_dlt[ i ] | u(v) |
|         left_side_crop_or_extend_flag[ i ] | u(1) |
|         if(num_depth_values_in_dlt[ i ] > num_depth_values_in_dlt[ 1 ] ) { | |
|           for ( j = 0; j < num_depth_values_in_dlt[ i ] − num_depth_values_in_dlt[ 1 ]; j++) | |
|             dlt_depth_value_diff_minus1 [ i ][ j ] | u(v) |
|         } | |
|       } | |
|     } | |
|   } | |
| ... | |

In the example of Table 7 above, the italicized elements indicate departures from the current syntax described above with respect to Table 1. In the example of Table 7, inter_view_dlt_pred_enable_flag[i] equal to 1 indicates the depth view with layer_id equal to i uses the inter-view DLT prediction method to signal the DLT in current view. In addition, inter_view_DLT_pred_enable_flag[i] equal to 0 indicates the depth view with layer_id equal to i does not use the inter-view DLT prediction method to signal the DLT in current view, instead, the DLT is signaled in the same way as the base view.

In addition, left_side_crop_or_extend_flag[i] equal to 1 indicates all the newly added depth values are inserted before the first entry of DLT in base view when num_depth_values_in_dlt[i] is larger than num_depth_values_in_dlt[1], and the first num_depth_values_in_dlt[i] entries of the DLT in base view are directly copied to the DLT in the view with layer_id equal to i when num_depth_values_in_dlt[i] is smaller than or equal to num_depth_values_in_dlt[1].

In addition, left_side_crop_or_extend_flag[i] equal to 0 indicates all the newly added depth values are inserted after the last entry of DLT in base view when num_depth_values_in_dlt[i] is larger than num_depth_values_in_dlt[1], and the last num_depth_values_in_dlt[i] entries of the DLT in base view are directly copied to the DLT in the view with layer_id equal to i when num_depth_values_in_dlt[i] is smaller than or equal to num_depth_values_in_dlt[1].

In addition, dlt_depth_value_diff_minus1[i][j] plus 1 specifies the difference of two depth values in the ((num_depth_values_in_dlt[i]−num_depth_values_in_dlt[1])−j)-th entry compared to the one in the ((num_depth_values_in_dlt[i]−num_depth_values_in_dlt[1])−j−1)-th entry in the DLT for depth view components with layer_id equal to i when left_side_crop_or_extend_flag[i] is equal to 1 and dlt_depth_value_diff_minus1[i][−1] is inferred to be 0. When left_side_crop_or_extend_flag[i] is equal to 0, dlt_depth_value_diff_minus1[i][j] plus 1 specifies the difference of two depth values in the (j+num_depth_values_in_dlt[1])-th entry compared to the one in the (j−1+num_depth_values_in_dlt[1])-th entry in the DLT for depth view components with layer_id equal to i.

In addition, dltDepthValue[i][j] indicates the j-th entry in the DLT for depth view components with layer_id equal to i (i is unequal to 1) and inter_view_dlt_pred_enable_flag[i] is equal to 1, and is derived as follows:
    set num_depth_values_in_dlt_view_diff[i]=num_depth_values_in_dlt[i]−num_depth_values_in_dlt[1];
    set StartPosInV0=(num_depth_values_in_dlt_view_diff[i]>0\|\|left_side_crop_or_extend_flag[i])?0: (0−num_depth_values_in_dlt_view_diff[i]);
    set NumTobeCopied=num_depth_values_in_dlt_view_diff[i]>0? num_depth_values_in_dlt[1]:num_depth_values_in_dlt[i];
    set StartPosInVi=(num_depth_values_in_dlt_view_diff[i]<=0\|\|!left_side_crop_or_extend_flag[i])?0: num_depth_values_in_dlt_view_diff[i];
    for (n=0; n<NumTobeCopied; n++)
    dlt_depth_value[i][n+StartPosInVi]=dlt_depth_value[1][n+StartPosInV0];
    when num_depth_values_in_dlt_view_diff[i] is larger than 0 and left_side_crop_or_extend_flag[i] is equal to 0, the following apply:
    for (j=num_depth_values_in_dlt[1]; j<num_depth_values_in_dlt[i]; j++)
    dlt_depth_value[i][j]=dlt_depth_value[i][j−1]+dlt_depth_value_diff_minus1[i][j−num_depth_values_in_dlt[1]]+1;
    when num_depth_values_in_dlt_view_diff[i] is larger than 0 and left_side_crop_or_extend_flag[i] is equal to 1, the following apply:
    for (j=(num_depth_values_in_dlt_view_diff[i]−1); j>=0; j−−)
    dlt_depth_value[i][j]=dlt_depth_value[i][j+1]−(dlt_depth_value_diff_minus1[i][num_depth_values_in_dlt_view_diff[i]−1−j]+1);

In another example, the process for inter-view DLT prediction may be similar to the example described above, however, one or more syntax elements and associated semantics may be changed to support inter-view DLT prediction when the number of valid depth values in a non-base view is larger than that of the base view. In this example, part of the newly added depth values are inserted before the first entry, and part of the newly added depth values are inserted after the last entry of the DLT in base view. Example VPS syntax for this example is shown in Table 8 below:

TABLE 8

| | Descriptor |
|---|---|
| vps_extension( ) { | |
| ... | |
|   if ( i % 2 ) { | |
|     enable_dmm_flag[ i ] | u(1) |
|     use_mvi_flag[ i ] | u(1) |
|     lim_qt_pred_flag[ i ] | u(1) |
|     dlt_flag[ i ] | u(1) |
|     if( dlt_flag[ i ] ) { | |
|       if (i != 1) | |
|         inter_view_dlt_pred_enable_flag[ i ] | u(1) |
|       if ( i = =1 \|\| !inter_view_dlt_pred_enable_flag[ i ] ) { | |
|         num_depth_values_in_dlt[ i ] | u(v) |
|         dlt_depth_start_value[ i ] | u(v) |
|         dlt_depth_delta_equal_flag[ i ] | u(1) |
|         if( dlt_depth_delta_equal_flag[ i ] ) | |
|           dlt_depth_detla_value[ i ] | u(v) |
|         else { | |
|           max_diff_minus1 [ i ] | u(v) |
|           for ( j = 1; j < num_depth_values_in_dlt[ i ]; j++) { | |
|             dlt_depth_value_diff_minus1 [ i ][ j ] | u(v) |
|           } | |
|         } | |
|       } | |
|       else { | |
|         num_depth_values_in_dlt[ i ] | u(v) |
|         depth_overlap_idc[ i ] | u(2) |
|         if(depth_overlap_idc[ i ] == 3 ) | |
|           number_left_nonoverlap_depth_values[ i ] | u(v) |
|         if(num_depth_values_in_dlt[ i ] > num_depth_values_in_dlt[ 1 ] ) { | |
|           max_diff_minus1 [ i ] | u(v) |
|           for ( j = 0; j < num_depth_values_in_dlt[ i ]-num_depth_values_in_dlt[ 1 ]; j++) | |
|             dlt_depth_value_diff_minus1 [ i ][ j ] | u(v) |
|         } | |
|       } | |
|     } | |
|   } | |
| ... | |

In the example of Table 8 above, the italicized elements indicate departures from the current syntax described above with respect to Table 1. In the example of Table 8, max_diff_minus1[i] specifies the range of the dlt_depth_value_diff_minus1[i][j]. The syntax element max_diff_minus1[i] is represented by Ceil(Log 2($2^{BitDepthY}$−num_depth_values_in_dlt[i])) bits. In addition, dlt_depth_value_diff_minus1[i][j] plus 1 specifies the difference of depth value between the j-th entry and the (j−1)-th entry in the DLT for depth view components with layer_id equal to i. The syntax element dlt_depth_value_diff_minus1[i][j] is represented by Ceil (Log 2(max_diff_minus1[i]+1)) bits.

In addition, depth_overlap_idc[i] specifies the overlapping status of the depth values of the view with layer_id equal to i and the depth values of the base view. When not present, depth_overlap_idc[i] may be inferred to be equal to 0. The depth_overlap_idc[i] equal to 0 indicate that the depth values of both views might not be overlapped, this value is currently reserved for once depth_overlap_idc[i] is present. The depth_overlap_idc[i] larger than 0 indicates that depth values of the view with layer_id equal to i and depth values of the base view are overlapped: dlt_depth_value[i][j+k] is set equal to dlt_depth_value[1][j], or dlt_depth_value[i][j] is set equal to dlt_depth_value[1][j+k], for k being equal to or greater than 0, and the number of consecutive equal depth values is equal to numOverlapValues, which is equal to min (num_depth_values_in_dlt[i], num_depth_values_in_dlt[1]).

The values of depth_overlap_idc[i] larger than 0 corresponds to the following cases:

depth_overlap_idc[i] equal to 1 indicates dlt_depth_value[i][j+k] is set equal to dlt_depth_value[1][j], wherein j is from 0 to numOverlapValues−1, inclusive, and k is equal to max(num_depth_values_in_dlt[i]−num_depth_values_in_dlt[1], 0).

depth_overlap_idc[i] equal to 2 indicates dlt_depth_value[i][j] is set equal to dlt_depth_value[1][j+k], wherein j is from 0 to numOverlapValues−1, inclusive, and k is equal to max(num_depth_values_in_dlt[1]−num_depth_values_in_dlt[i], 0).

depth_overlap_idc[i] equal to 3 indicates dlt_depth_value[i][j+k] is set equal to dlt_depth_value[1][j] when num_depth_values_in_dlt[i] is larger than num_depth_values_in_dlt[1], or dlt_depth_value[i][j] is equal to dlt_depth_value[1][j+k] when num_depth_values_in_dlt[i] is smaller than num_depth_values_in_dlt[1], wherein j is from 0 to numOverlapValues−1, inclusive, and k is equal to number_left_nonoverlap_depth_values[i].

In addition, referring still to the example shown in Table 8, number_left_nonoverlap_depth_values[i] specifies the number of non-overlapped depth values of the view with layer_id equal to i or 1 to the left side of the overlapped depth value region. In some examples, number_left_nonoverlap_depth_values[i] is in a range of 0 to Abs(num_depth_values_in_dlt[1]−num_depth_values_in_dlt[i]), exclusive. When not present, number_left_nonoverlap_depth_values[i] may be inferred to be equal to 0. When depth_overlap_idc[i] is larger than 0 and num_depth_values_in_dlt[i] is larger than num_depth_values_in_dlt[1], the non-overlapped depth values of the view with layer_id equal to i are derived as follows:

set numDepthValuesDiff=num_depth_values_in_dlt[i]−num_depth_values_in_dlt[1]
  set numTobeInsertedLeft=(depth_overlap_idc[i]==1?numDepthValuesDiff: number_left_nonoverlap_depth_values[i])
  if (depth_overlap_idc[i]&2)
  for (j=num_depth_values_in_dlt[1]+number_left_nonoverlap_depth_values[i]; j<num_depth_values_in_dlt[i]; j++)
  dlt_depth_value[i][j]=dlt_depth_value[i][j−1]+dlt_depth_value_diff_minus1[i][j−num_depth_values_in_dlt[1]]+1;
  the following apply:
  for (j=numTobeInsertedLeft−1; j>=0; j−−)
    dlt_depth_value[i][j]=dlt_depth_value[i][j+1]−(dlt_depth_value_diff_minus1[i][numTobeInsertedLeft−1−j]+1);

In still another example, for inter-view DLT prediction, even when the number of valid depth values of a non-base view is larger than that of the base view, a portion of the newly added depth values may be inserted before the first entry, and a portion of the newly added depth values may be inserted after the last entry of the DLT in base view. In this example, inter-view DLT prediction method may still be used, i.e., inter_view_dlt_pred_enable_flag equal to 1. Example VPS syntax for this example is shown in Table 9 below:

TABLE 9

| | Descriptor |
|---|---|
| vps_extension( ) { | |
| ... | |
|   if ( i % 2 ) { | |
|     enable_dmm_flag[ i ] | u(1) |

TABLE 9-continued

|  | Descriptor |
|---|---|
| use_mvi_flag[ i ] | u(1) |
| lim_qt_pred_flag[ i ] | u(1) |
| dlt_flag[ i ] | u(1) |
| if( dlt_flag[ i ] ) { | |
|   if (i != 1) | |
|     inter_view_dlt_pred_enable_flag[ i ] | u(1) |
|   if ( i = = 1 \|\| !inter_view_dlt_pred_enable_flag[ i ] ) | |
|     ... | |
|   } | |
|   else { | |
|     num_depth_values_in_dlt[ i ] | u(v) |
|     crop_extend_both_side_flag[ i ] | u(1) |
|     if (!crop_extend_both_side_flag[ i ] ) | |
|       left_side_crop_or_extend_flag[ i ] | u(1) |
|     else | |
|       number_left_nonoverlap_depth_values[ i ] | u(v) |
|     if(num_dept_values_in_dlt[ i ] > num_depth_values_in_dlt[ 1 ] ) { | |
|       max_diff_minus1 [ i ] | u(v) |
|       for ( j = 0; j < num_depth_values_in_dlt[ i ]−num_depth_values_in_dlt[ 1 ]; j++) | |
|         dlt_depth_value_diff_minus1 [ i ][ j ] | u(v) |
|     } | |
|   } | |
| } | |
| ... | |

In the example of Table 9 above, the italicized elements indicate departures from the current syntax described above with respect to Table 1. In this example, crop_extend_both_side_flag[i] equal to 1 may indicate that a portion of the non-overlapped depth values are inserted before the first entry of DLT in base view and the remaining depth values are inserted after the last entry of DLT in base view, or the medium num_depth_values_in_dlt[i] depth values of a DLT of a base view are overlapped by the view with layer_id equal to i. In addition, crop_extend_both_side_flag[i] equal to 0 indicates all of the non-overlapped depth values are inserted before the first entry or after the last entry of DLT in base view, or the first or last num_depth_values_in_dlt[i] depth values of DLT in base view are overlapped by the view with layer_id equal to i.

In addition, crop_extend_both_side_flag[i] equal to 1 indicates dlt_depth_value[i][j+k]=dlt_depth_value[1][j] when num_depth_values_in_dlt[i] is larger than num_depth_values_in_dlt[1], or dlt_depth_value[i][j]=dlt_depth_value[0][j+k] when num_depth_values_in_dlt[i] is smaller than num_depth_values_in_dlt[1], where j is from 0 to numOverlapValues−1, inclusive, and k is equal to number_left_nonoverlap_depth_values[i]. In addition, crop_extend_both_side_flag[i] equal to 0 and left_side_crop_or_extend_flag[i] equal to 1 indicates dlt_depth_value[i][j+k]=dlt_depth_value[1][j], wherein j is from 0 to numOverlapValues−1, inclusive, and k is equal to max(num_depth_values_in_dlt[i]−num_depth_values_in_dlt[1], 0). In addition, crop_extend_both_side_flag[i] equal to 0 and left_side_crop_or_extend_flag[i] equal to 0 indicates dlt_depth_value[i][j]=dlt_depth_value[1][j+k], wherein j is from 0 to numOverlapValues−1, inclusive, and k is equal to max(num_depth_values_in_dlt[1]−num_depth_values_in_dlt[i], 0).

In the example above, number_left_nonoverlap_depth_values[i] specifies the number of non-overlapped depth values of the view with layer_id equal to i or 1 to the left side of the overlapped depth value region. The number_left_nonoverlap_depth_values[i] may have a range of 0 to abs (num_depth_values_in_dlt[1]−num_depth_values_in_dlt[i]), exclusive. When not present, number_left_nonoverlap_depth_values[i] may be inferred to be equal to 0.

In addition, dltDepthValue[i][j] indicates the j-th entry in the DLT for depth view components with layer_id equal to i (i is unequal to 1) and inter_view_dlt_pred_enable_flag[i] is equal to 1, and may be derived as follows:

when inter_view_dlt_pred_enable_flag[i] is equal to 1, num_depth_values_in_dlt[i] is larger than num_depth_values_in_dlt[1], the non-overlapped depth values of the view with layer_id equal to i are derived as follows:
set numDepthValuesDiff=num_depth_values_in_dlt[i]−num_depth_values_in_dlt[0]
set leftStartPosVi=crop_extend_both_side_flag[i]==1? number_left_nonoverlap_depth_values[i]: 0
set numTobeInsertedLeft=crop_extend_both_side_flag[i]==1? number_left_nonoverlap_depth_values[i]: numDepthValuesDiff
when crop_extend_both_side_flag[i] is equal to 1 or left_side_crop_or_extend_flag[i] is equal to 0, the following applies:
for (j=num_depth_values_in_dlt[1]+leftStartPosVi; j<num_depth_values_in_dlt[i]; j++)
dlt_depth_value[i][j]=dlt_depth_value[i][j−1]+dlt_depth_value_diff_minus1[i][j−num_depth_values_in_dlt[1]]+1;
when crop_extend_both_side_flag[i] is equal to 1 or left_side_crop_or_extend_flag[i] is equal to 1, the following applies:
for (j=numTobeInsertedLeft−1; j>=0; j−−)
dlt_depth_value[i][j]=dlt_depth_value[i][j+1]−(dlt_depth_value_diff_minus1[i][numTobeInsertedLeft−1−j]+1);

Aspects of this disclosure also relate to signaling of DLT prediction. For example, while the examples of Tables 2-9 are described with respect to a VPS, in some examples, such signaling may be performed in another parameter set, such as a PPS.

In an example, the DLTs can be signaled in a VPS or SPS if the DLTs are only needed at the sequence level. However, when needed at the picture level, for example, the DLTs of multiple views may be signaled as part of the slice header extension of the base view. Additionally or alternatively, the DLTs may be signaled only in one of the following situations: when a flag indicates the presence of the DLT; when the current slice is a random access slice; when the current slice has a slice type of Intra.

In some examples, the inter-view prediction of the DLTs of multiple views may not be enabled, and each DLT may be signaled in a slice header with a flag indicating the presence of the DLT, or when the slice has a NAL unit type which indicates the slice belongs to a random access picture. In other examples, a DLT may be signaled in an adaptation parameter set, as set forth in HEVC.

For slice-level DLT prediction, in an example, a DLT may be signaled in slice header and the difference between the numbers of depth values (e.g., the number of elements in the DLTs) between two slices within one picture may be signaled. In this example, inter-slice DLT prediction may be achieved using any combination of the techniques described herein with respect to inter-view DLT prediction.

In still other examples, a DLT may be signaled in a PPS and the difference between the numbers of depth values (i.e., the number of elements in the DLTs) between two different pictures in one view is signaled. Again, in this example, inter-picture DLT prediction may be achieved using any combination of the techniques described herein with respect to inter-view DLT prediction.

In one example, DLTs are present in a slice header to support picture level DLT signaling by setting slice_segment_header_extension_present_flag in PPS to be 1 and conveying the information with the bytes after the syntax element of slice_segment_header_extension_length. In this case, the DLTs may only be present in the slice header associated with the base view components.

In another example, a DLT may be signaled in one slice header (e.g., slice header "A") and inter-view prediction of another DLT may be enabled through slice header prediction. For example, one or more slice headers (e.g., for view components within the same access unit) may be predicted by the slice header "A" containing a DLT.

In another example, DLTs may be present in PPSs, e.g., by setting the pps_extension_flag to 1. In addition, the DLTs may be only present in the PPSs that are referred to by the slices in the view components of the base view. In this case, a PPS may still be referred by view components of non-base views. One PPS may contain all DLTs for multiple views. In other examples, a DLT of a view component may be present in a PPS and referred to only by view components belonging to the same view.

Figure 8:
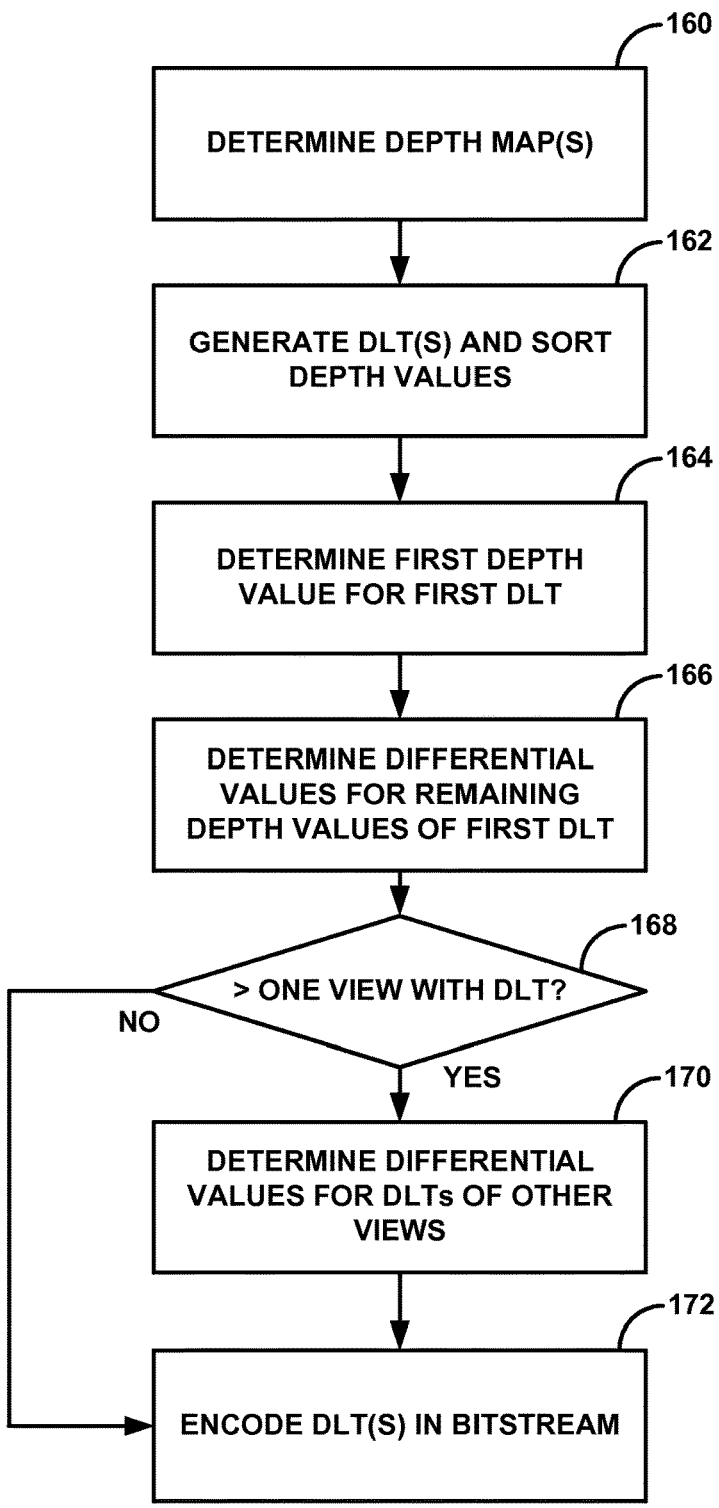
FIG. 8 is a flow diagram illustrating a process for encoding depth lookup tables (DLTs), according to aspects of this disclosure.

FIG. 8 is a flowchart illustrating an example method for coding information related to view synthesis prediction. The method of FIG. 8 is explained with respect to video encoder 20 (FIGS. 1 and 2). However, it should be understood that other video coding devices may be configured to perform a similar method. Moreover, certain steps in the method may be performed in a different order or in parallel. Likewise, certain steps may be omitted, and other steps may be added, in various examples.

In the example of FIG. 8, video encoder 20 may determine one or more depth maps for a number of pictures and/or slices (160). In some instances, video encoder 20 may encode multiple views, and may encode a depth map of one or more of the views. Video encoder 20 may generate DLTs for the depth maps and sort the depth values of the depth maps, e.g., in ascending order (162). In instances in which video encoder 20 encodes multiple views, video encoder 20 may generate a DLT for one or more of the views.

According to some aspects of this disclosure, video encoder 20 may determine a first depth value for a first DLT (164). In addition, video encoder 20 may determine differential values for remaining depth values of the first DLT (166). For example, video encoder may encode one or more depth values of the first DLT relative to one or more other values of the first DLT. In some examples, video encoder 20 may determine a difference between consecutive values of the first DLT and encode the difference values. In other examples, as noted above, video encoder 20 may determine second order differences, e.g., between more than two consecutive values. In some examples, video encoder 20 may consider a range of depth value differences (e.g., a maximum difference or minimum difference) when coding the difference values.

Video encoder 20 may determine whether there is more than one view with an associated DLT (168). In some examples, if there is more than one view with an associated DLT, video encoder 20 may determine differential depth values for the DLTs of the other views (170). For example, video encoder 20 may encode one or more syntax elements indicating that one or more depth values of one DLT are the same as one or more depth values of another DLT of another view. In some examples, as noted above, the syntax elements may indicate the locations of the overlapping depth values (e.g., the depth values that appear in more than one DLT).

Video encoder 20 may then encode the DLTs in a bitstream (172). For example, video encoder 20 may encode data representing the syntax elements described herein and may, in some examples, include such data in a parameter set, such as a PPS.

Figure 9:
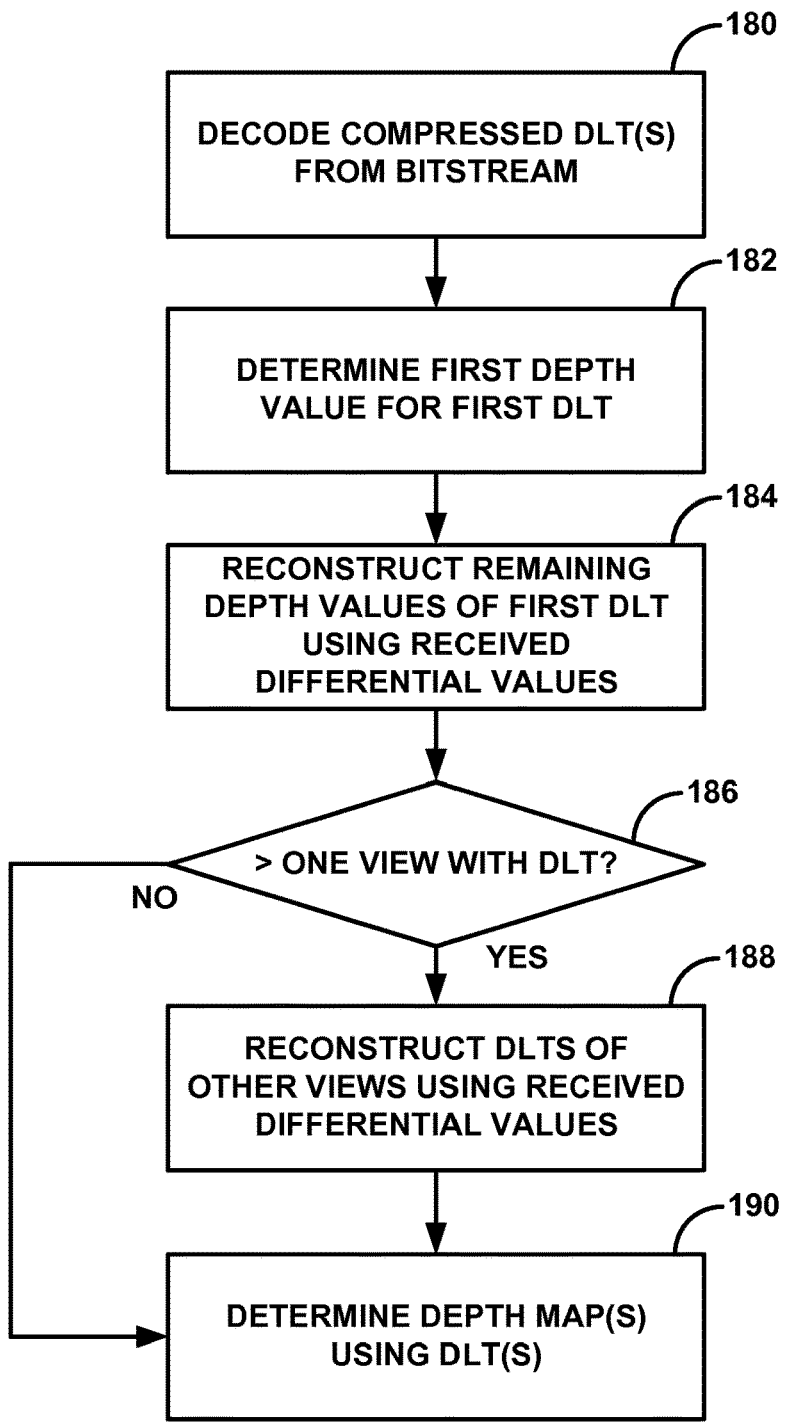
FIG. 9 is a flow diagram illustrating a process for decoding DLTs, according to aspects of this disclosure.

FIG. 9 is a flowchart illustrating an example method for coding information related to view synthesis prediction. The method of FIG. 9 is explained with respect to video decoder 30 (FIGS. 1 and 3). However, it should be understood that other video coding devices may be configured to perform a similar method. Moreover, certain steps in the method may be performed in a different order or in parallel. Likewise, certain steps may be omitted, and other steps may be added, in various examples.

In the example of FIG. 9, video decoder 30 decodes compressed DLTs from an encoded bitstream (180). For example, video decoder 30 may decode a set of depth difference values, which may indicate the value of one or more depth value relative to the value of one or more other depth values. In addition, video decoder 30 may decode a variety of other information to assist video decoder 30 in reconstructing DLTs (e.g., such as the other syntax described above with respect to Tables 2-9).

According to some aspects of this disclosure, video decoder 30 may determine a first depth value for a first DLT (182). For example, video decoder 30 may receive one or more syntax elements indicating the value of the relative first depth value of the first DLT and determine the first depth value based on the syntax.

In addition, video decoder 30 may reconstruct remaining depth values of the first DLT using received differential values for the remaining depth values (184). For example, video decoder 30 may receive one or more syntax elements indicating the value of the one or more depth values relative to one or more other depth values of the first DLT. In some examples, video decoder 30 may decode one or more syntax elements indicating a difference between consecutive values of the first DLT. In other examples, as noted above, video decoder 30 may receive syntax elements indicating second order differences, e.g., between more than two consecutive values. In some examples, video decoder 30 may consider a range of depth value differences (e.g., a maximum difference or minimum difference) when decoding the difference values. In any case, video decoder 30 may reconstruct the first DLT based on the received values, e.g., by adding a difference value to the appropriate previously reconstructed depth value.

In some instances, video decoder 30 may decode multiple views, and may decode a DLT and depth map of one or more of the views. Accordingly, video decoder 30 may determine whether there is more than one view with an associated DLT (186). In some examples, if there is more than one view with an associated DLT, video decoder 30 may reconstruct DLTs of other views using received differential values for the DLTs of the other views (188). For example, video decoder 30 may decode one or more syntax elements indicating that one or more depth values of one DLT are the same as one or more depth values of another DLT of another view. In some examples, as noted above, the syntax elements may indicate the locations of the overlapping depth values (e.g., the depth values that appear in more than one DLT).

Video decoder 30 may then determine depth maps for pictures using the decoded DLTs (190). For example, as noted above, video decoder 30 may determine an index to the DLT for the depth values of the pictures (e.g., based on a combination of a index difference value and a predictor).

The techniques described above may be performed by video encoder 20 (FIGS. 1 and 2) and/or video decoder 30 (FIGS. 1 and 3), both of which may be generally referred to as a video coder. In addition, video coding may generally refer to video encoding and/or video decoding, as applicable.

While the techniques of this disclosure are generally described with respect to 3D-HEVC, the techniques are not limited in this way. The techniques described above may also be applicable to other current standards or future standards not yet developed. For example, the techniques for depth coding may also be applicable to a multi-view extension of HEVC (e.g., so called MV-HEVC), a scalable extension to HEVC, or other current or future standards having a depth component.

It should be understood that, depending on the example, certain acts or events of any of the methods described herein can be performed in a different sequence, may be added, merged, or left out all together (e.g., not all described acts or events are necessary for the practice of the method). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable storage medium and packaging materials.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other aspects are within the scope of the following claims.

What is claimed is:

1. A method of decoding video data, the method comprising:
   determining, from a bitstream, a first depth value of a depth look up table (DLT) that includes all valid depth values of a depth map, wherein the depth values in the DLT are sorted in ascending order;
   decoding, from the bitstream, a set of depth difference values, wherein a range of the depth difference values is signaled in the bitstream, wherein each of the depth difference values has a fixed length that is dependent on the range of the depth difference values;
   reconstructing the DLT using the first depth value and the set of depth difference values, wherein reconstructing the DLT comprises: including the first depth value of the DLT in the DLT and, for each respective depth value of the DLT after the first depth value of the DLT, calculating the respective depth value by adding a respective depth difference value of the set of depth difference values to a depth value that immediately precedes in the DLT the respective depth value;

decoding, from the bitstream, an index difference;

calculating a sum of the decoded index difference and an index of a predictor;

mapping, based on the DLT, the sum to a depth value in a depth slice of the video data; and decoding the video data based on the depth value in the depth slice.

2. The method of claim 1, wherein the DLT is a first DLT and the first DLT is associated with a first view, the method further comprising:

determining at least one depth value of a second DLT based on a depth value in the first DLT, wherein the second DLT is associated with a second, different view; and decoding, from the bitstream, a syntax element indicating whether the second view uses inter-view DLT prediction to signal the second DLT.

3. The method of claim 2, wherein the second DLT includes a plurality of consecutive depth values that are included in the first DLT, and wherein determining the at least one depth value of the second DLT comprises decoding, from the bitstream, an indication of which of the plurality of consecutive depth values of the second DLT are the same as consecutive depth values of the first DLT.

4. The method of claim 1, wherein the first depth value of the DLT and the set of depth difference values are signaled in at least one of a picture parameter set, a sequence parameter set, or a slice header.

5. An apparatus for decoding video data, the apparatus comprising:

a memory configured to store video data; and one or more processors configured to:

determine, from a bitstream, a first depth value of a depth look up table (DLT) that includes all valid depth values of a depth map, wherein the depth values in the DLT are sorted in ascending order;

decode, from the bitstream, a set of depth difference values, wherein a range of the depth difference values is signaled in the bitstream, wherein each of the depth difference values has a fixed length that is dependent on the range of the depth difference values;

reconstruct the DLT using the first depth value and the set of depth difference values, wherein reconstructing the DLT comprises: including the first depth value of the DLT in the DLT and, for each respective depth value of the DLT, calculating the respective depth value by adding a respective depth difference value of the set of depth difference values to a depth value that immediately precedes in the DLT the respective depth value;

decode, from the bitstream, an index difference;

calculate a sum of the decoded index difference and an index of a predictor;

map, based on the DLT, the sum to a depth value in a depth slice of the video data; and decode the video data based on the depth value in the depth slice.

6. The apparatus of claim 5, wherein the DLT is a first DLT and the first DLT is associated with a first view, and wherein the one or more processors are further configured to:

determine at least one depth value of a second DLT based on a depth value in the first DLT, wherein the second DLT is associated with a second, different view; and decode, from the bitstream, a syntax element indicating whether the second view uses inter-view DLT prediction to signal the second DLT.

7. The apparatus of claim 6, wherein the second DLT includes a plurality of consecutive depth values that are included in the first DLT, and wherein the one or more processors are configured to decode, from the bitstream, an indication of which of the plurality of consecutive depth values of the second DLT are the same as consecutive depth values of the first DLT.

8. The apparatus of claim 5, wherein the first depth value of the DLT and the set of depth difference values are signaled in at least one of a picture parameter set, a sequence parameter set, or a slice header.

9. An apparatus for decoding video data, the apparatus comprising:

means for determining, from a bitstream, a first depth value of a depth look up table (DLT) that includes all valid depth values of a depth map, wherein the depth values in the DLT are sorted in ascending order;

means for decoding, from the bitstream, a set of depth difference values, wherein a range of the depth difference values is signaled in the bitstream, wherein each of the depth difference values has a fixed length that is dependent on the range of the depth difference values;

means for reconstructing the DLT using the first depth value and the set of depth difference values, wherein reconstructing the DLT comprises: including the first depth value of the DLT in the DLT and, for each respective depth value of the DLT after the first depth value of the DLT, calculating the respective depth value by adding a respective depth difference value of the set of depth difference values to a depth value that immediately precedes in the DLT the respective depth value;

means for decoding, from the bitstream, an index difference;

means for calculating a sum of the decoded index difference and an index of a predictor;

means for mapping, based on the DLT, the sum to a depth value in a depth slice of the video data; and means for decoding the video data based on the depth value in the depth slice.

10. A non-transitory computer-readable storage medium having instructions stored thereon that, when executed, cause one or more processors to:

determine, from a bitstream, a first depth value of a depth look up table (DLT) that includes all valid depth values of a depth map, wherein the depth value in the DLT are sorted in ascending order;

decode, from the bitstream, a set of depth difference values, wherein a range of the depth difference values is signaled in the bitstream, wherein each of the depth difference values has a fixed length that is dependent on the range of the depth difference values;

reconstruct the DLT using the first depth value and the set of depth difference values, wherein reconstructing the DLT comprises: including the first depth value of the DLT in the DLT and, for each respective depth value of the DLT after the first depth value of the DLT, calculating the respective depth value by adding a respective depth difference value of the set of depth difference values to a depth value that immediately precedes in the DLT the respective depth value;

decode, from the bitstream, an index difference;

calculate a sum of the decoded index difference and an index of a predictor;

map, based on the DLT, the sum to a depth value in a depth slice of the video data; and decode the video data based on the depth value in the depth slice.

11. The method of claim 1, the method being executable on a wireless communication device, wherein the wireless communication device comprises:

a data storage medium configured to store the video data;

a processor configured to execute instructions to process the video data stored in the data storage medium; and a receiver configured to receive the bitstream.

12. The method of claim 11, wherein the wireless communication device is a cellular telephone and the bitstream is modulated according to a communication standard.

13. The apparatus of claim 5, wherein the apparatus is a wireless communication device, the wireless communication device comprising a receiver to receive the bitstream.

14. The apparatus of claim 13, wherein the wireless communication device is a cellular telephone and the bitstream is modulated according to a communication standard.

* * * * *